(12) United States Patent
Nakazono et al.

(10) Patent No.: US 8,954,642 B2
(45) Date of Patent: Feb. 10, 2015

(54) SIGNAL TRANSFER CIRCUIT FOR OFFSETTING SIGNAL DELAY

(71) Applicant: Olympus Corporation, Tokyo (JP)

(72) Inventors: Keisuke Nakazono, Tokyo (JP); Masami Shimamura, Hanno (JP); Yoshinobu Tanaka, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 256 days.

(21) Appl. No.: 13/674,380

(22) Filed: Nov. 12, 2012

(65) Prior Publication Data

US 2013/0124765 A1 May 16, 2013

(30) Foreign Application Priority Data

Nov. 16, 2011 (JP) ................................. 2011-250684

(51) Int. Cl.
*G06F 13/16* (2006.01)
*G06F 13/00* (2006.01)

(52) U.S. Cl.
CPC ............ *G06F 13/1605* (2013.01); *G06F 13/00* (2013.01)
USPC ............................. 710/110; 710/240; 710/241

(58) Field of Classification Search
CPC ... G06F 13/16; G06F 13/1605; G06F 13/161; G06F 13/1621; G06F 13/1652; G06F 13/1663; G06F 13/1668; G06F 13/1689; G06F 13/364; G06F 13/4291
USPC ......................................... 710/110, 240, 241
See application file for complete search history.

(56) References Cited

U.S. PATENT DOCUMENTS

| | | | |
|---|---|---|---|
| 6,604,159 B1 * | 8/2003 | Thekkath et al. | 710/110 |
| 7,444,668 B2 * | 10/2008 | Moyer et al. | 726/2 |
| 7,913,013 B2 * | 3/2011 | Oikawa | 710/110 |
| 2007/0083688 A1 * | 4/2007 | Abe | 710/240 |
| 2008/0288688 A1 * | 11/2008 | Kang et al. | 710/110 |

FOREIGN PATENT DOCUMENTS

JP 2006-039672 A 2/2006

* cited by examiner

*Primary Examiner* — Glenn A Auve
(74) *Attorney, Agent, or Firm* — Westerman, Hattori, Daniels & Adrian, LLP

(57) ABSTRACT

A signal transfer circuit comprising a control signal transfer unit configured to output an access request output signal and a memory address output signal to the arbiter after timings of the access request input signal of the access request and the memory address input signal input from the bus master have been adjusted, and output an access permission output signal, and a data signal transfer unit configured to output each data output signal to the corresponding bus master or the arbiter after a timing of each data input signal of the access request input from the arbiter or the bus master is adjusted, and output a data validity period output signal to the bus master after a timing of a data validity period input signal indicating a period in which each data is valid in the access request input from the arbiter is adjusted.

11 Claims, 12 Drawing Sheets

FIG. 8

| CNT | WE | RE |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |
| 2 | 0 | 0 |
| 2 | 0 | X |
| 2 | 1 | 0 |
| 2 | 1 | X |

FULL: rows with CNT=0,0 (WE=1 marked X)
EMPTY: rows with CNT=2 (RE marked X)

| EN1 | EN2 | SEL | |
|---|---|---|---|
| 0 | 0 | 0 | |
| 0 | 1 | 1 | TRANSFER AND OUTPUT FROM FLIP-FLOP 321 TO FLIP-FLOP 322 |
| 0 | 0 | 0 | |
| 0 | 1 | 1 | TRANSFER AND OUTPUT FROM FLIP-FLOP 321 TO FLIP-FLOP 322 |
| 0 | 0 | 0 | |
| 0 | 0 | 0 | |
| 1 | 0 | 0 | LATCH TO FLIP-FLOP 321 |
| 0 | 1 | 0 | LATCH AND OUTPUT TO FLIP-FLOP 322 |
| 0 | 0 | 0 | |
| 0 | 0 | 0 | |
| 0 | 1 | 0 | LATCH (OUTPUT) TO FLIP-FLOP 322 |
| 0 | 1 | 0 | LATCH (OUTPUT) TO FLIP-FLOP 322 |

SIGNAL TRANSFER CIRCUIT FOR OFFSETTING SIGNAL DELAY

BACKGROUND OF THE INVENTION

1. Field of the Invention

The present invention relates to a signal transfer circuit.

Priority is claimed on Japanese Patent Application No. 2011-250684, filed Nov. 16, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In many system large-scale integrations (LSIs) mounted on image processing apparatuses such as a still-image camera, a moving-image camera, a medical endoscope camera, and an industrial endoscope camera, a plurality of embedded processing blocks (hereinafter referred to as "bus masters") share one connected dynamic random access memory (DRAM). In the system LSIs as described above, each of the plurality of embedded bus masters accesses the DRAM using direct memory access (DMA). In addition, the system LSI includes an arbiter that arbitrates an access request to the DRAM issued from each of a plurality of embedded bus masters. The arbiter controls actual access to the DRAM while appropriately arbitrating the access request to the DRAM issued from each bus master.

In the system LSI as described above, a protocol related to timings of signals input and output between the arbiter and the bus master is predetermined. In this protocol, the timing of a control signal between the arbiter and the bus master such as the access request to the DRAM output from the bus master to the arbiter or the access permission to the DRAM output from the arbiter to the bus master is set. In addition, in this protocol, the timing of data between the arbiter and the bus master, such as data written to the DRAM that is output from the bus master to the arbiter, and data read from the DRAM that is output from the arbiter to the bus master, is defined.

FIGS. 10A and 10B are diagrams illustrating examples of configurations and control timings of an arbiter and bus masters in a system LSI in accordance with the related art. In FIG. 10A, an example of connections between the arbiter and the bus masters in the system LSI in accordance with the related art is illustrated. In the system LSI in accordance with the related art, for example, as illustrated in FIG. 10A, a plurality of bus masters 92 to 94 are connected to an arbiter 91 and share one DRAM 90. Although a plurality of signal lines only connected between the arbiter 91 and the bus master 92 are illustrated in FIG. 10A, a plurality of signal lines are also similarly connected between the arbiter 91 and the bus masters 93 and 94.

In FIG. 10B, an example of a timing chart according to a protocol in the system LSI in accordance with the related art is illustrated. In FIG. 10B, a timing chart of signals when data is written from the bus master to the DRAM is illustrated. In the following description, the case in which the bus master 92 writes data to the DRAM 90 will be described.

If a request (REQ) signal indicating an access request to the DRAM 90 from each of the bus masters 92 to 94 illustrated in FIG. 10A to the arbiter 91 is issued (output), the arbiter 91 selects one bus master (for example, the bus master 92) according to a predetermined arbitration algorithm. The arbiter 91 returns (outputs) an acknowledge (AEN) signal indicating the acceptance of the access request, that is, the permission of the access request, to the selected bus master (for example, the bus master 92).

The bus master 92 whose access request has been accepted, that is, the bus master 92 to which the acknowledge (AEN) signal has been input, stops the issuance of the request (REQ) signal in the same clock cycle when the next access request to the DRAM 90 is not continuously issued.

In addition, the arbiter 91 issues (outputs) a data enable (DEN) signal indicating a period in which writing of data to the DRAM 90 is valid to the bus master 92 whose access request has been accepted at a timing at which data access to the DRAM 90 is possible. If the data enable (DEN) signal is input, the bus master 92 sequentially outputs write data (WDATA), which is data to be written to the DRAM 90, from the same clock cycle. In FIG. 10B, the case in which write data (WDATA) of four bursts is sequentially output is illustrated.

When the bus master reads data from the DRAM, read data (RDATA), which is data read from the DRAM output from the arbiter at the same timing as write data (WDATA) illustrated in FIG. 10B is received.

As described above, each bus master accesses the DRAM (writes data to the DRAM or reads data from the DRAM) via the arbiter by performing access at the timing of a predetermined protocol between the arbiter and the bus master (for example, see Japanese Unexamined Patent Application, First Publication No. 2006-39672).

However, in the protocol as described above, there are paths in which timing for signals that are input and output between the arbiter and the bus master is strict. FIGS. 11A and 11B are diagrams illustrating an example of a path in which timing is strict in the system LSI in accordance with the related art. In FIG. 11A, an example of control timings in which timing when data is written from the bus master to the DRAM is strict is illustrated. In FIG. 11B, a path of a signal line in which timing is strict in an example of a connection between the arbiter and the bus master in the system LSI in accordance with the related art is illustrated. In FIG. 11B, the case in which the bus master 92 writes data to the DRAM 90 and the bus master 93 reads data from the DRAM 90 is illustrated.

As illustrated in FIG. 11A, when the bus master continuously issues an access request to the DRAM 90, the bus master should perform (control) issuance stop and re-issuance of a request (REQ) signal corresponding to an acknowledge (AEN) signal input from the arbiter 91 within one clock cycle (see timing A of FIG. 11A). In addition, even when each bus master outputs write data (WDATA) corresponding to a data enable (DEN) signal input from the arbiter 91 or even when read data (RDATA) input along with the data enable (DEN) signal is received, it is necessary to access all of the data within one clock cycle (see timing B of FIG. 11A).

In this case, a path indicated by a heavy line in FIG. 11B serves as a path in which timing is strict. More specifically, when the bus master 92 continuously issues an access request to the DRAM 90, the acknowledge (AEN) signal input from an arbitration circuit 911 of the arbiter 91 is first input to a request generation circuit 921 (a request generation circuit 931 in the bus master 93). If the acknowledge (AEN) signal is input, the request generation circuit 921 (or the request generation circuit 931) determines whether to stop the issuance of the request (REQ) signal or whether to continuously issue the request (REQ) signal. When the issuance of the request (REQ) signal is determined to be stopped, the request generation circuit 921 (or the request generation circuit 931) initializes (resets) a flip-flop 922 (a flip-flop 932 in the bus master 93). In addition, when the request (REQ) signal is determined to be continuously issued, the request generation circuit 921 (or the request generation circuit 931) inputs the request (REQ) signal to the flip-flop 922 (or the flip-flop 932). Because the determination by the request generation circuit 921 (or the request generation circuit 931) and control for the flip-flop 922 (or the flip-flop 932) should be performed during a clock cycle in which the acknowledge (AEN) signal has been input, that is, because the determination result should be reflected in the next clock cycle, timing becomes severe.

In addition, when the bus master 92 outputs the write data (WDATA), the data enable (DEN) signal input from the arbitration circuit 911 within the arbiter 91 is first input to the data control circuit 923. The data control circuit 923 outputs the write data (WDATA) to be initially output to the arbiter 91 to a flip-flop 924 based on the input data enable (DEN) signal. The data control circuit 923 needs to output the initial write data (WDATA) to the flip-flop 924 until the next clock cycle of the flip-flop 924. Thereafter, the data control circuit 923 sequentially outputs the next write data (WDATA) to the flip-flop 924 for every clock cycle. In FIG. 11A, the case in which four-burst write data (WDATA) is output twice in continuity is illustrated.

In addition, when the bus master 93 receives read data (RDATA), a data enable (DEN) signal input from the arbitration circuit 911 within the arbiter 91 is first input to a data latch control circuit 933. The data latch control circuit 933 outputs a data latch signal for receiving the read data (RDATA) initially output from the arbiter 91 to the flip-flop 934 based on the input data enable (DEN) signal. The data latch control circuit 933 needs to output an initial data latch signal to the flip-flop 934 before the next clock cycle of the flip-flop 934. Thereafter, the data latch control circuit 933 sequentially outputs a data latch signal for receiving the next read data (RDATA) to the flip-flop 934.

As described above, there is a path in which timing is strict according to a limitation of the protocol in the system LSI in accordance with the related art. The strict timing of the path becomes stricter if a distance between a position in which the arbiter 91 is disposed within the system LSI and a position in which each bus master is disposed increases. Thus, it is difficult to increase the number of embedded bus masters for a high-performance system LSI in the system LSI in accordance with the related art. This is because the distance between the position in which the arbiter 91 is disposed within the system LSI and the position in which each bus master is disposed is likely to be further increased by increasing the number of bus masters to be embedded in the system LSI.

If the layout positions of the arbiter and the bus master are away from each other, a wiring length of a signal to be input and output between the arbiter and the bus master becomes long and a delay time of wiring increases. If the delay time of wiring increases, a time until the acknowledge (AEN) signal or the data enable (DEN) signal output from the arbitration circuit 911 within the arbiter 91 is input to each bus master becomes long. Thereby, there is a problem in that a time available for control or a data output that is necessary to be performed before the next clock cycle within the bus master becomes short and the control or the data output does not end before the next clock cycle, that is, the protocol is not conformed.

In addition, a circuit scale of the arbitration circuit 911 within the arbiter 91 also increases by increasing the number of bus masters embedded in the system LSI. Thereby, the number of circuit stages (the number of logical stages) through which each signal passes also increases. Thus, an output of the acknowledge (AEN) signal or the data enable (DEN) signal from the arbitration circuit 911 may also be delayed.

In addition, it is difficult to speed up an operation clock for a high-performance system LSI in the system LSI in accordance with the related art. This is because a period of one clock cycle is shortened by speeding up the operation clock of the system LSI.

If the period of one clock cycle is shortened, the time available for the control or the data output that is necessary to be performed before the next clock cycle within the bus master is also shortened. Thus, there is a problem in that it may be impossible to speed up an operation clock to a certain extent or more to keep the protocol when a delay time of a signal by the number of logical stages of the request generation circuit 921 (or the request generation circuit 931), the data control circuit 923, or the data latch control circuit 933 is considered.

The acknowledge (AEN) signal or the data enable (DEN) signal output from the arbitration circuit 911 within the arbiter 91 is also temporarily latched in the flip-flop, so that a time available for the control or data output necessary to be performed within one clock cycle may be secured.

FIGS. 12A and 12B are diagrams illustrating an example of a configuration and control timings of a bus master that latches a signal output from an arbiter in the system LSI in accordance with the related art. In FIG. 12A, an example of a connection between the arbiter and the bus master that latches the signal output from the arbiter in the system LSI in accordance with the related art is illustrated. FIG. 12A illustrates the configuration of the bus master in which a flip-flop 925 that latches the acknowledge (AEN) signal output from the arbitration circuit 911 within the arbiter 91 and a flip-flop 926 that latches the data enable (DEN) signal output from the arbitration circuit 911 within the arbiter 91 are added to the bus master 92 illustrated in FIG. 11B.

In FIG. 12B, an example of a timing chart according to the protocol in the system LSI in accordance with the related art is illustrated. In FIG. 12B, a timing chart of signals when data is written from the bus master 92 illustrated in FIG. 12A to the DRAM is illustrated. In the following description, it is described that the next access request to the DRAM 90 is not continuously issued when the bus master 92 writes data to the DRAM 90.

If the request (REQ) signal representing the access request to the DRAM 90 from the bus master 92 to the arbiter 91 is issued (output) as illustrated in FIG. 12A, the arbiter 91 selects the bus master 92 according to a predetermined arbitration algorithm and returns (outputs) the acknowledge (AEN) signal. The bus master 92 temporarily latches the input acknowledge (AEN) signal in the flip-flop 925 and outputs the latched acknowledge (AEN_d) signal to the request generation circuit 921. The request generation circuit 921 stops the issuance of the request (REQ) signal by initializing the flip-flop 922 based on the acknowledge (AEN_d) signal temporarily latched by the flip-flop 925.

Thereby, the request (REQ) signal input to the arbiter 91 is stopped as illustrated in FIG. 12B. However, because the issuance of the request (REQ) signal is stopped based on the acknowledge (AEN_d) signal temporarily latched by the flip-flop 925, a timing delayed by a period C of FIG. 12B is provided. Thus, the arbiter 91 falsely recognizes that the access request to the DRAM 90 has been continuously issued from the bus master 92 during the period C.

In addition, the arbiter 91 issues (outputs) the data enable (DEN) signal to the bus master 92 at the timing at which data access to the DRAM 90 is possible. The bus master 92 temporarily latches the input data enable (DEN) signal in the flip-flop 926, and outputs the latched data enable (DEN_d) signal to the data control circuit 923. The data control circuit 923 outputs write data (WDATA) initially output to the arbiter 91 to the flip-flop 924 based on the data enable (DEN_d) signal temporarily latched by the flip-flop 926. The data control circuit 923 outputs the initial write data (WDATA) to the flip-flop 924 before the next clock cycle of the flip-flop 924.

Thereby, as illustrated in FIG. 12B, the write data (WDATA) is input from the bus master 92 to the arbiter 91. However, because the output of the write data (WDATA) to the arbiter 91 is performed based on the data enable (DEN_d) signal temporarily latched by the flip-flop 926, its timing is later than that of the data enable (DEN) signal output by the arbiter 91 as illustrated in period D of FIG. 12B. Thus, the arbiter 91 writes data to the DRAM 90 before the initial write data (WDATA) is input from the bus master 92 at the beginning of period D. In addition, at the end of period D, the arbiter 91 does not write the last (fourth) write data (WDATA) input from the bus master 92 to the DRAM 90.

When the bus master reads data from the DRAM, read data (RDATA) is input to the bus master at the same timing as that of the write data (WDATA) illustrated in FIG. 10B or 11A. At this time, the timing of the data latch signal based on the data enable (DEN_d) signal temporarily latched by the flip-flop is later than that of the data enable (DEN) signal output by the arbiter 91. Thus, it may be impossible for the bus master (for example, the bus master 93) receiving the read data (RDATA) to receive the initial read data (RDATA) output from the arbiter 91. In addition, the bus master receives data after the last read data (RDATA) output from the arbiter 91.

As described above, in a method of securing a time available for control or a data output necessary to be performed within one clock cycle by simply temporarily latching the acknowledge (AEN) signal or the data enable (DEN) signal output from the arbiter in a flip-flop, it may be impossible to access the DRAM in a state in which the above-described protocol predetermined between the arbiter and the bus master has been kept.

SUMMARY

The present invention provides a signal transfer circuit, which can improve a limitation of the timing of an input/output signal between an arbiter and a bus master that perform access in accordance with a protocol.

A signal transfer circuit, which is inserted between each of a plurality of bus masters outputting an access request to a memory and an arbiter that arbitrates the access request to the memory input from each of the bus masters connected to the memory and controls access to the memory according to the access request, and relays each signal between the arbiter and a corresponding bus master may include: a control signal transfer unit configured to output an access request output signal and a memory address output signal to the arbiter after timings of the access request input signal of the access request and the memory address input signal input from the bus master have been adjusted when the access request to the memory input from the corresponding bus master is relayed to the arbiter, and output an access permission output signal, which permits the access request, previous to an access permission input signal, which indicates that the access request is permitted, input from the arbiter to the bus master; and a data signal transfer unit configured to output each data output signal to the corresponding bus master or the arbiter after a timing of each data input signal of the access request input from the arbiter or the bus master is adjusted when a plurality of data is relayed to the bus master or the arbiter in the access request to the memory input from the corresponding bus master, and output a data validity period output signal to the bus master after a timing of a data validity period input signal indicating a period in which each data is valid in the access request input from the arbiter is adjusted.

The control signal transfer unit may include: an access request timing adjustment unit configured to determine whether or not to output the access request output signal based on the access request input signal and the access permission input signal, output an output timing signal indicating that the access request output signal is output when the access request output signal is determined to be output, and output the access request output signal from the next timing after the output timing signal has been output; an address timing adjustment unit configured to output the memory address input signal as the memory address output signal from the next timing after the output timing signal has been output; and an access permission timing adjustment unit configured to output the output timing signal as the access permission output signal at the next timing. The access request timing adjustment unit may determine that the access request output signal corresponding to a previous access request by the bus master has already been output when the access request input signal corresponding to a current access request has been input from the corresponding bus master, that an output of the access request output signal corresponding to the current access request is held when the access permission input signal, which permits the previous access request, is not input from the arbiter, and that the access request output signal corresponding to the current access request is output when the access permission input signal, which permits the previous access request, has been input from the arbiter.

When the bus master corresponding to the signal transfer circuit is a bus master that reads data from the memory according to the access request, the data signal transfer unit may include: a read data timing adjustment unit configured to output each data input signal input from the arbiter as each data output signal to the bus master at the next timing; and a read data validity period timing adjustment unit configured to output the data validity period input signal input from the arbiter as the data validity period output signal to the bus master at the next timing.

When the bus master corresponding to the signal transfer circuit is a bus master that writes data to the memory according to the access request, the data signal transfer unit may include: a write data validity period timing adjustment unit configured to output the data validity period output signal to the bus master before the data validity input signal input from the arbiter; and a write data timing adjustment unit configured to include a plurality of data retention units that retain a predetermined number of data input signals or all data input signals within a plurality of data input signals input from the bus master according to an early output data validity period output signal, temporarily retain each data input signal input from the bus master in each data retention unit at the next timing, and output each retained data input signal as each data output signal after a timing has been adjusted to the arbiter when the data validity period input signal has been input from the arbiter.

The write data validity period timing adjustment unit may include: a permission access measurement unit configured to measure the number of permitted access requests in which an output of all data output signals corresponding to the access request to the arbiter does not end based on the access permission output signal and the data validity period output signal, and output a remaining permission access signal, which indicates whether or not there is a permitted access request to the arbiter, which is generated based on a measuring result, that has already been permitted by the corresponding bus master and the output of all the data output signals to the arbiter has not ended; and a data measuring unit configured to measure the number of data retention units capable of retaining the data input signal based on the data validity period input signal and the data validity period output signal, and output the number of retainable data, which is a measuring result, and a retention enable/disable signal, which indicates whether or not there is the data retention unit capable of retaining the data input signal, generated based on the measuring result. A signal generated based on the remaining permission access signal and the retention enable/disable signal may be output as the data validity period output signal. The write data timing adjustment unit may include a data retention control unit configured to control whether or not to retain each data input signal input from the bus master in one data retention unit within a plurality of data retention units based on the number of retainable data, the data validity period output signal, and the data validity period input signal.

The write data timing adjustment unit may include first and second data retention units, which retain two data input signals input from the bus master at the next timing, and outputs the data input signal retained by the second data retention unit as the data output signal to the arbiter. The data retention control unit may control the first and second data retention units so as to: cause the first data retention unit to retain the data input signal at the next timing when the number of retainable data indicates that the number of data retention units capable of retaining the data input signal is 1, the data validity period output signal indicates that the data input signal is valid, and the data validity period input signal indicates that the data output signal is invalid; cause the second data retention unit to retain the data input signal at the next timing when the number of retainable data indicates that the number of data retention units capable of retaining the data input signal is 2 and the data validity period output signal indicates that the data input signal is valid; cause the second data retention unit to retain the data input signal retained in the first data retention unit at the next timing when the number of retainable data indicates that the number of data retention units capable of retaining the data input signal is 0 and the data validity period input signal indicates that the data output signal is valid; and cause the second data retention unit to retain the data input signal at the next timing when the number of retainable data indicates that the number of data retention units capable of retaining the data input signal is 1, the data validity period output signal indicates that the data input signal is valid, and the data validity period input signal indicates that the data output signal is valid.

The next timing may be a timing of a common clock cycle in which the signal transfer circuit, the arbiter, and the bus master operate.

According to the present invention, it is possible to improve a limitation of the timing of an input/output signal between an arbiter and a bus master that perform access in accordance with a protocol.

BRIEF DESCRIPTION OF THE DRAWINGS

The above features and advantages of the present invention will be more apparent from the following description of certain preferred embodiments taken in conjunction with the accompanying drawings, in which:

FIG. 8 is a truth table illustrating a control method when the write data transfer module corresponding to the bus master that writes data to the DRAM latches the data to be written to the DRAM in the signal transfer circuit in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1B:
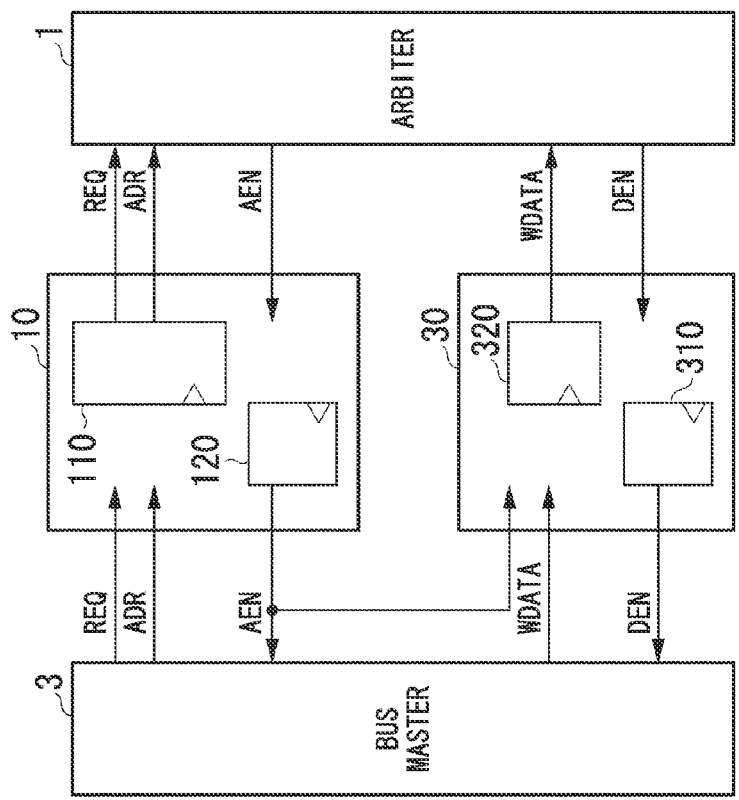
FIGS. 1A and 1B are block diagrams illustrating basic configurations of a signal transfer circuit in accordance with a first preferred embodiment of the present invention.
Figure 1A:
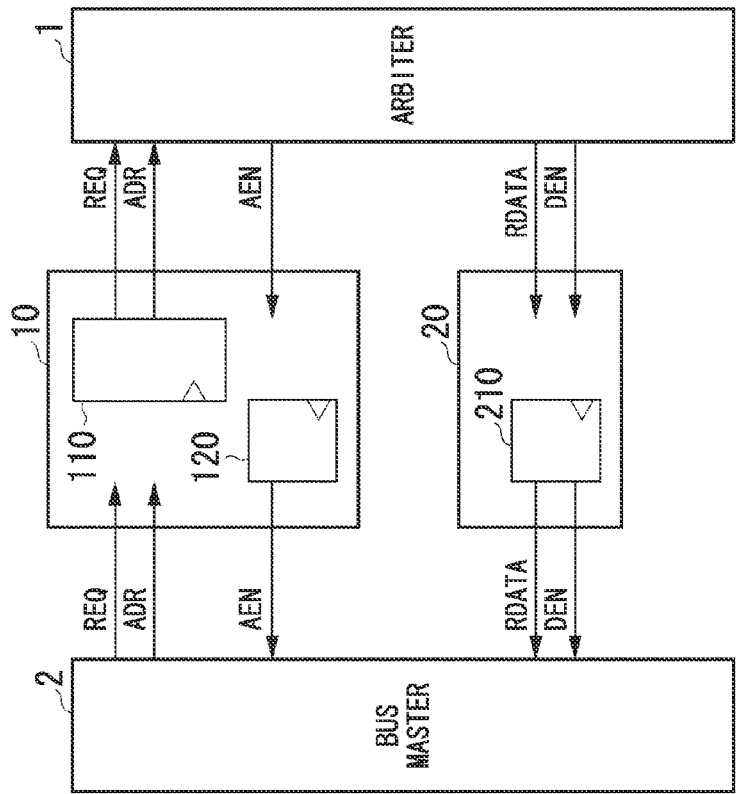

FIGS. 1A and 1B are block diagrams illustrating basic configurations of a signal transfer circuit in accordance with a first preferred embodiment of the present invention. FIGS. 1A and 1B illustrate basic concepts of the signal transfer circuit in accordance with the first preferred embodiment. As illustrated in FIGS. 1A and 1B, the signal transfer circuit in accordance with the first preferred embodiment of the present invention is inserted between an arbiter and a bus master. The signal transfer circuit is a circuit that transfers (relays) a signal to be input/output between the arbiter and the bus master. At this time, a set of the signal transfer circuit and the arbiter and a set of the bus master and the signal transfer circuit are accessed at the timing according to the same protocol as a predetermined protocol between the arbiter and the bus master.

In FIG. 1A, a signal transfer circuit inserted between a bus master (hereinafter referred to as "read bus master") 2, which reads data from a DRAM, and an arbiter 1 is illustrated. The signal transfer circuit inserted between the read bus master 2 and the arbiter 1 includes a control signal transfer module 10 and a read data transfer module 20. In addition, in FIG. 1B, a signal transfer circuit inserted between a bus master (hereinafter referred to as "write bus master") 3, which writes data to the DRAM, and an arbiter 1 is illustrated. The signal transfer circuit inserted between the write bus master 3 and the arbiter 1 includes a control signal transfer module 10 and a write data transfer module 30. In the following description, either of the read bus master 2 and the write bus master 3 is also simply referred to as the "bus master."

Figure 11A:
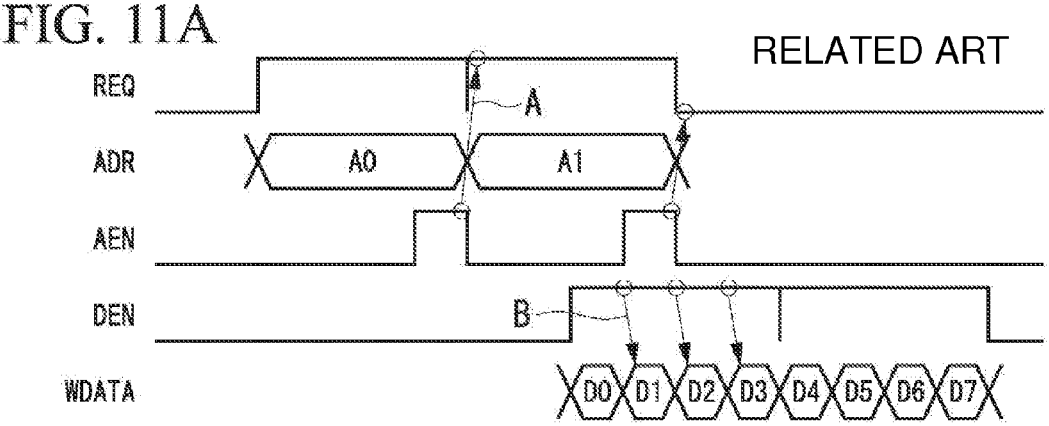
FIGS. 11A and 11B are diagrams illustrating an example of a path in which timing is strict in the system LSI in accordance with the related art.
Figure 11B:
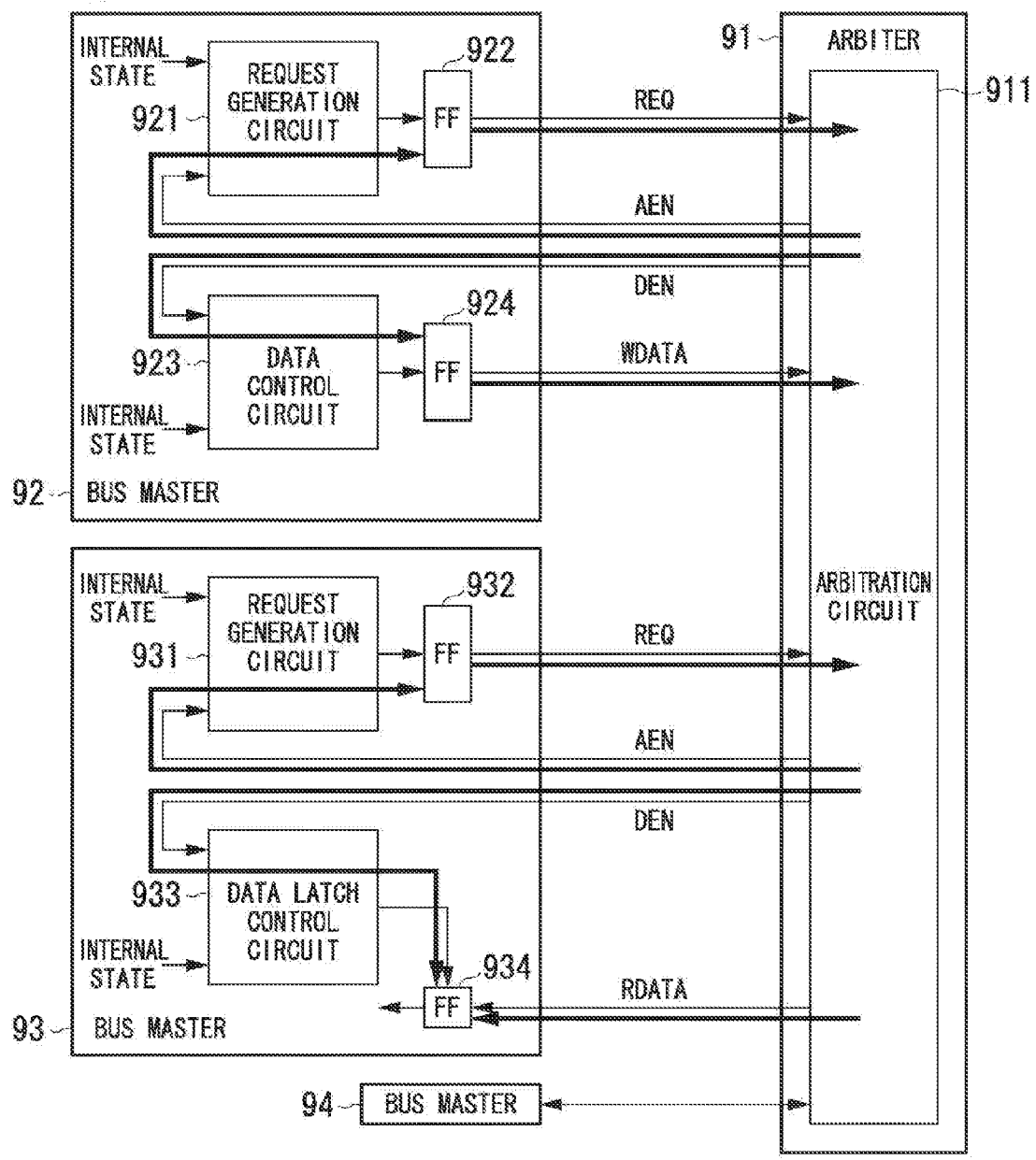
Figure 12A:
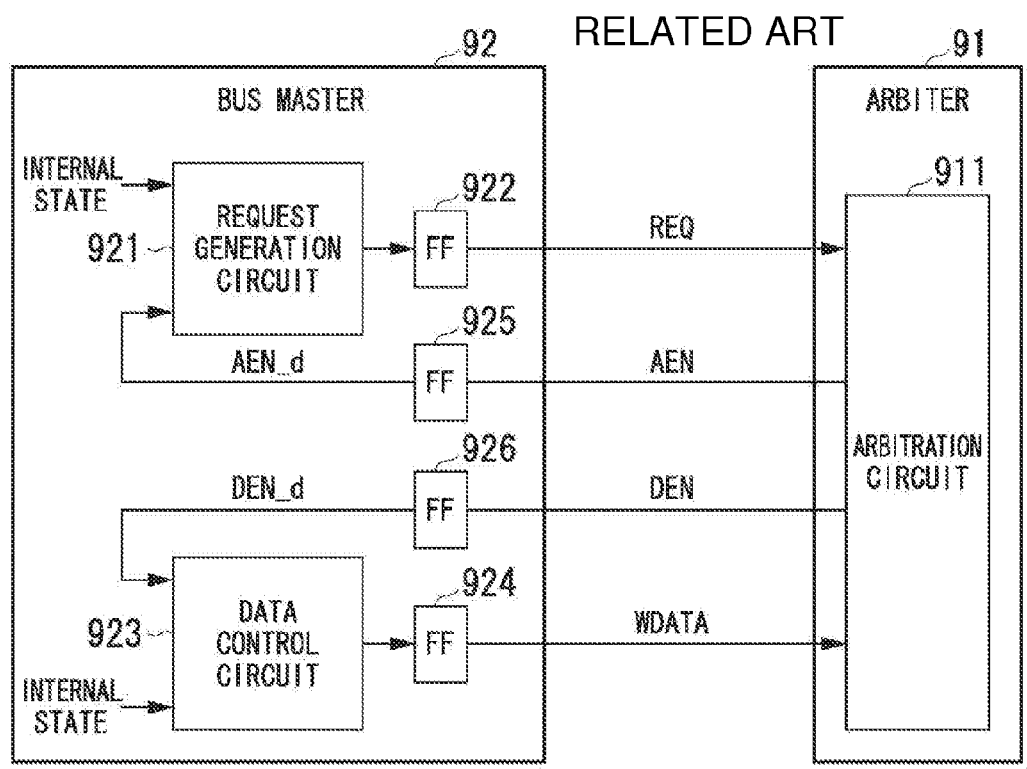
FIGS. 12A and 12B are diagrams illustrating an example of a configuration and control timings of a bus master that latches a signal output from an arbiter in the system LSI in accordance with the related art.
Figure 12B:
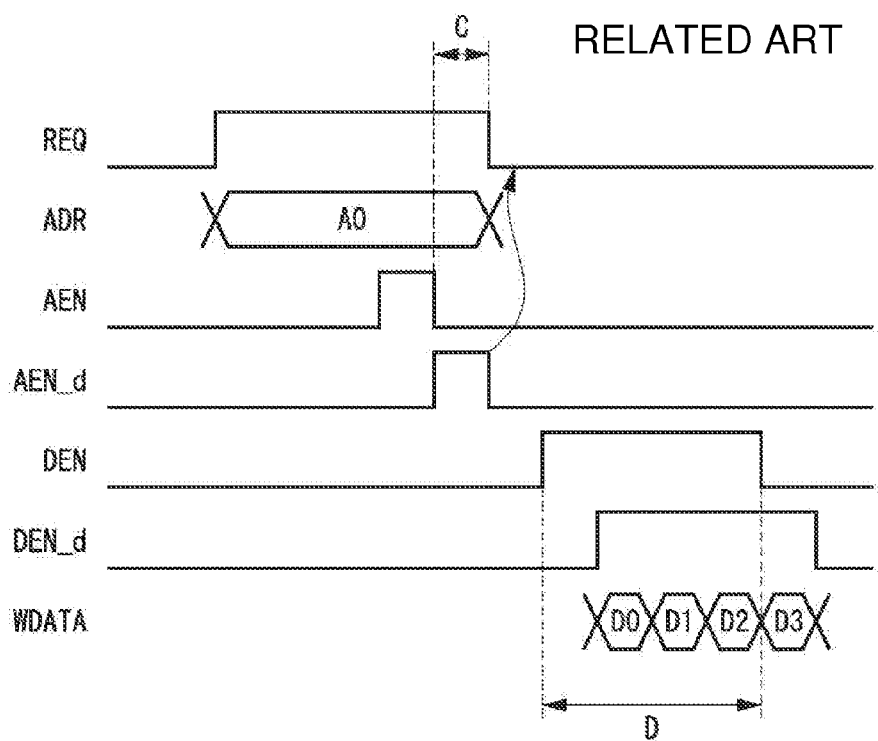

Operations of the read bus master 2, the write bus master 3, and the arbiter 1 are the same as those of the bus master and the arbiter embedded in the system LSI in accordance with the related art. More specifically, the arbiter 1 controls actual access to the DRAM (not illustrated) while appropriately arbitrating the access request to the DRAM issued from each bus master as in the arbiter 91 illustrated in FIGS. 10A, 10B, 11A, and 11B. In addition, like the bus master 93 illustrated in FIG. 11B, the read bus master 2 outputs an access request for reading data from the DRAM (not illustrated) to the arbiter 1 and receives data input from the DRAM (not illustrated) via the arbiter 1 after the access request is permitted by the arbiter 1. In addition, like the bus master 92 illustrated in FIG. 11B, the write bus master 3 outputs an access request for writing data to the DRAM (not illustrated) to the arbiter 1, and outputs data to be written to the DRAM (not illustrated) via the arbiter 1 after the access request is permitted by the arbiter 1. Accordingly, detailed description related to the operations of the read bus master 2, the write bus master 3, and the arbiter 1 is omitted here.

The control signal transfer module 10 relays a request (REQ) signal representing the access request to the DRAM issued (output) from the read bus master 2 or the write bus master 3 to the arbiter 1 and an address (ADR) representing an address of the DRAM to be accessed. In addition, the control signal transfer module 10 relays an acknowledge (AEN) signal indicating the acceptance of the access request to the DRAM, that is, the permission of the access request, which is returned (output) to the bus master selected by the arbiter 1.

A timing adjustment unit 110 adjusts timings of the request (REQ) signal and the address (ADR), and the control signal transfer module 10 makes an output to the arbiter 1. In addition, the control signal transfer module 10 outputs the acknowledge (AEN) signal generated by a timing adjustment unit 120 to the read bus master 2 or the write bus master 3 at the timing before the acknowledge (AEN) signal is input from the arbiter 1. Thereby, the control signal transfer module 10 alleviates a limitation of a signal delay which is caused because the layout position of the arbiter 1 within the system LSI and the layout position of the bus master are separated or a clock cycle is shortened by speeding up an operation clock of the system LSI. A detailed description related to the control signal transfer module 10 will be given later.

The read data transfer module 20 relays a data enable (DEN) signal, which indicates a period in which data read from the DRAM is valid, to be output to the read bus master 2 selected by the arbiter 1, and read data (RDATA), which is data read from the DRAM. The signal transfer circuit inserted between the read bus master 2 and the arbiter 1 is used as a set of the control signal transfer module 10 and the read data transfer module 20.

A timing adjustment unit 210 adjusts timings of the data enable (DEN) signal and the read data (RDATA), and the read data transfer module 20 makes an output to the read bus master 2. Thereby, the read data transfer module 20 alleviates a limitation of a signal delay time which is caused because a layout position of the arbiter 1 within the system LSI and a layout position of the read bus master 2 are away from each other or a clock cycle is shortened by speeding up an operation clock of the system LSI. A detailed description related to the read data transfer module 20 will be provided later.

The write data transfer module 30 relays a data enable (DEN) signal, which indicates a period in which writing of data to the DRAM is valid, to be output to the write bus master 3 selected by the arbiter 1 and write data (WDATA), which is data to be written to the DRAM, to be output from the write bus master 3 to the arbiter 1. The signal transfer circuit inserted between the write bus master 3 and the arbiter 1 is used as a set of the control signal transfer module 10 and the write data transfer module 30.

The write data transfer module 30 outputs the data enable (DEN) signal generated by a timing adjustment unit 310 to the write bus master 3 at the timing before the data enable (DEN) signal is input from the arbiter 1, that is, at an early timing. In addition, a timing adjustment unit 320 adjusts the timing of the write data (WDATA), then the write data transfer module 30 outputs the write data (WDATA) to the arbiter 1. Thereby, the write data transfer module 30 alleviates a limitation of a signal delay time which is caused because a layout position of the arbiter 1 within the system LSI and a layout position of the write bus master 3 are away from each other or a clock cycle is shortened by speeding up an operation clock of the system LSI. A detailed description related to the write data transfer module 30 will be provided later.

Figure 2:
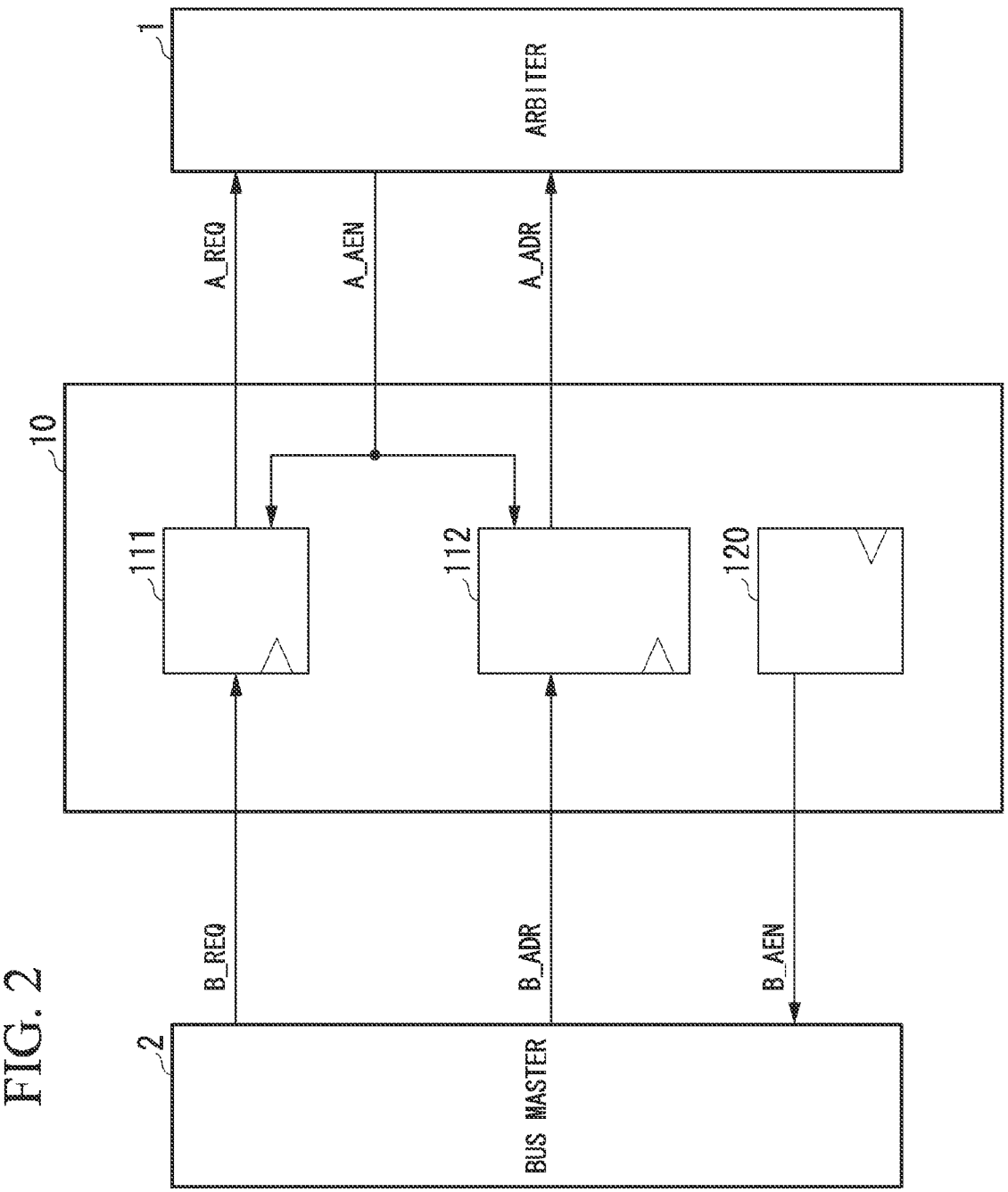
FIG. 2 is a block diagram illustrating a schematic configuration of a control signal transfer module corresponding to a control signal between an arbiter and a bus master in the signal transfer circuit in accordance with the first preferred embodiment of the present invention.

Next, the control signal transfer module 10 will be described. FIG. 2 is a block diagram illustrating a schematic configuration of the control signal transfer module 10 corresponding to a control signal between the arbiter and the bus master in the signal transfer circuit in accordance with the first preferred embodiment of the present invention. In FIG. 2, the control signal transfer module 10 included in the signal transfer circuit inserted between the arbiter 1 and the read bus master 2 is illustrated. The control signal transfer module 10 included in the signal transfer circuit inserted between the arbiter 1 and the write bus master 3 also has the same configuration.

The control signal transfer module 10 includes a request timing adjustment unit 111 and an address timing adjustment unit 112 as the timing adjustment unit 110 and the timing adjustment unit 120. In the following description, the timing adjustment unit 120 is also referred to as the acknowledge timing adjustment unit 120.

The control signal transfer module 10 adjusts the timing of the request (REQ) signal input from the read bus master 2 in the request timing adjustment unit 111 and makes an output to the arbiter 1. The request timing adjustment unit 111, for example, outputs the request (REQ) signal to the arbiter 1 at substantially the same timing as when the request (REQ) signal has been temporarily latched. In addition, the address timing adjustment unit 112 adjusts the timing of the address (ADR) input from the read bus master 2 simultaneously with the request (REQ) signal, then the control signal transfer module 10 outputs the address (ADR) to the arbiter 1. The timing of the output of the address (ADR) to the arbiter 1 is, for example, at substantially the same timing as when the address (ADR) has been temporarily latched. Thereby, the request (REQ) signal and the address (ADR) input from the read bus master 2 are adjusted to the timing of the clock cycle by the control signal transfer module 10, and relayed to the arbiter 1.

In the following description, the request (REQ) signal and the address (ADR) input from the read bus master 2 are referred to as a bus master request signal B_REQ and a bus master address B_ADR, respectively. In addition, the request (REQ) signal and the address (ADR) output to the arbiter 1 are referred to as an arbiter request signal A_REQ and an arbiter address A_ADR, respectively.

In addition, the control signal transfer module 10 outputs the acknowledge (AEN) signal generated by the acknowledge timing adjustment unit 120 to the read bus master 2 at the timing at which the arbiter request signal A_REQ and the arbiter address A_ADR of which the timings have been adjusted are output to the arbiter 1, that is, at substantially the same timing as when the request timing adjustment unit 111 and the address timing adjustment unit 112 have temporarily latched the bus master request signal B_REQ and the bus master address B_ADR, respectively. Thereby, the acknowledge (AEN) signal is input to the read bus master 2 at the timing before the acknowledge (AEN) signal to be returned when the arbiter 1 has selected the read bus master 2, that is, at an early timing.

In the following description, the acknowledge (AEN) signal input from the arbiter 1 is referred to as an arbiter acknowledge signal A_AEN. In addition, the acknowledge (AEN) signal output to the read bus master 2 is referred to as a bus master acknowledge signal B_AEN.

The control signal transfer module 10 does not output the arbiter request signal A_REQ and the arbiter address A_ADR of which the timings have been directly adjusted to the arbiter 1 when the bus master request signal B_REQ and the bus master address B_ADR have been re-input from the read bus master 2 by returning the bus acknowledge signal B_AEN to the read bus master 2.

The arbiter request signal A_REQ and the arbiter address A_ADR corresponding to the re-input bus master request signal B_REQ and bus master address B_ADR are output to the arbiter 1 after the arbiter acknowledge signal A_AEN from the arbiter 1 has been input to the control signal transfer module 10. In addition, the control signal transfer module 10 outputs the bus master acknowledge signal B_AEN generated by the acknowledge adjustment unit 120 to the read bus master 2 in correspondence with the re-input bus master request signal B_REQ and bus master address B_ADR at the timing at which the arbiter request signal A_REQ and the arbiter address A_ADR of which the timings have been adjusted are output from the request timing adjustment unit 111 and the address timing adjustment unit 112 to the arbiter 1.

Thereafter, likewise, the control signal transfer module 10 iterates an operation of outputting the arbiter request signal A_REQ and the arbiter address A_ADR corresponding to the re-input bus master request signal B_REQ and bus master address B_ADR to the arbiter 1 and an operation of outputting the bus master acknowledge signal B_AEN to the read bus master 2 after the arbiter acknowledge signal A_AEN has been input from the arbiter 1.

According to the above-described operation, the control signal transfer module 10 relays the request (REQ) signal and the address (ADR) issued (output) from the bus master to the arbiter 1 and the acknowledge (AEN) signal to be returned (output) from the arbiter 1 to the bus master. Thereby, it is possible to set the timing of a signal between the arbiter 1 and the bus master, for example, to substantially the same state as when the flip-flop has been inserted, after a predetermined protocol between the arbiter 1 and the bus master has been kept between the control signal transfer module 10 and the arbiter 1 and between the bus master and the control signal transfer module 10 by inserting the control signal transfer module 10 between the arbiter 1 and the bus master.

Figure 3:
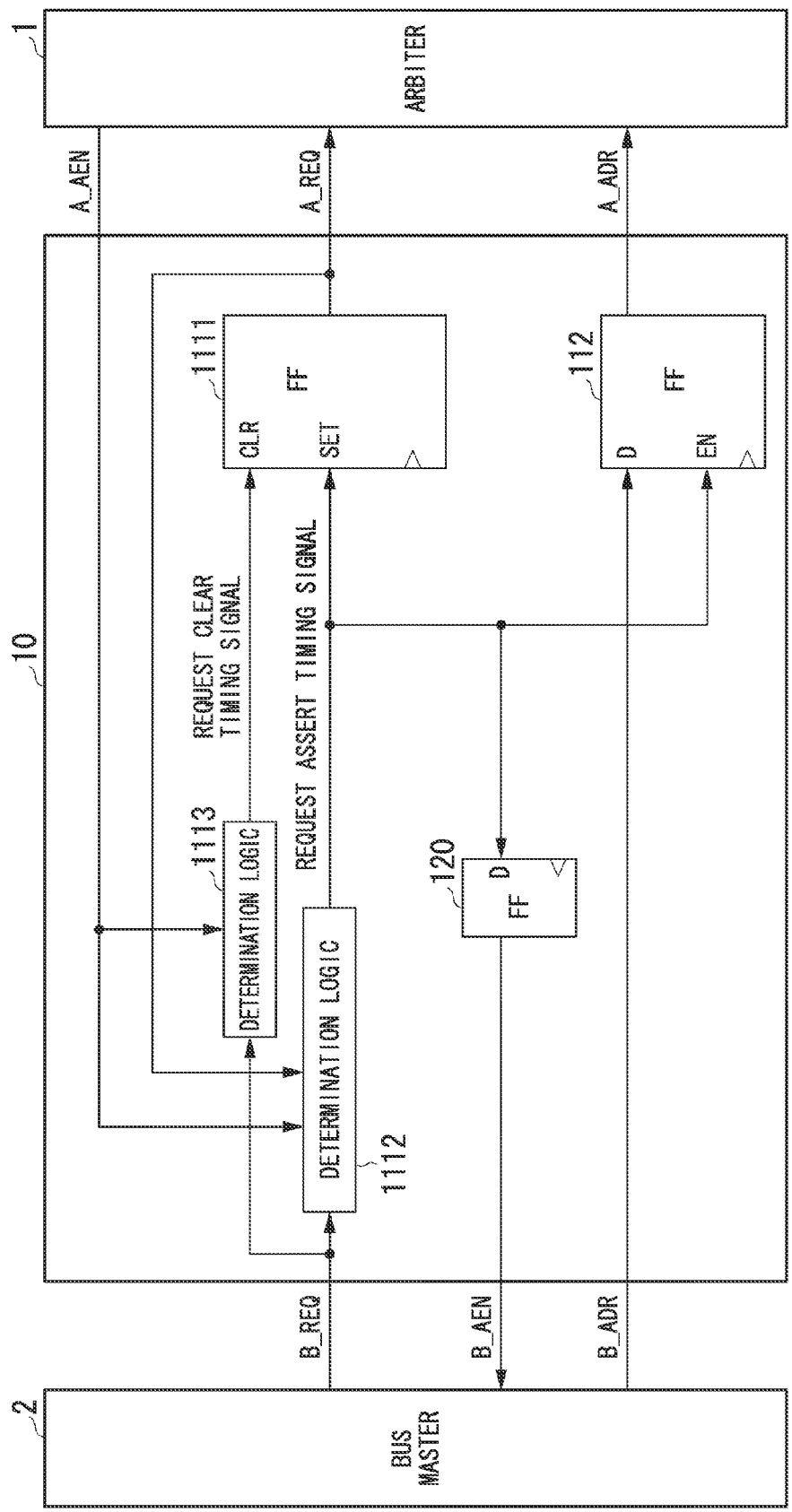
FIG. 3 is a circuit diagram illustrating an example of a configuration of a control signal transfer module corresponding to the control signal between the arbiter and the bus master in the signal transfer circuit in accordance with the first preferred embodiment of the present invention.

Next, a more detailed configuration of the control signal transfer module 10 will be described. FIG. 3 is a circuit diagram illustrating an example of a configuration of the control signal transfer module 10 corresponding to a control signal between the arbiter and the bus master in the signal transfer circuit in accordance with the first preferred embodiment of the present invention. In FIG. 3, as in FIG. 2, the control signal transfer module 10 inserted between the arbiter 1 and the read bus master 2 is illustrated. The control signal transfer module 10 inserted between the arbiter 1 and the write bus master 3 also has substantially the same configuration.

In the control signal transfer module 10, the request timing adjustment unit 111 includes a flip-flop 1111 and determination logics 1112 and 1113. In addition, the address timing adjustment unit 112 and the acknowledge timing adjustment unit 120 are each constituted of a flip-flop. In the following description, the address timing adjustment unit 112 is also referred to as the flip-flop 112, and the acknowledge timing adjustment unit 120 is also referred to as the flip-flop 120.

The determination logic 1112 generates a request assert timing signal representing the timing at which the output of the arbiter request signal A_REQ to the arbiter 1 is started, and outputs the generated request assert timing signal to a set (SET) terminal of the flip-flop 1111. In addition, the request assert timing signal is also output to an enable (EN) terminal of the flip-flop 112 and a data (D) terminal of the flip-flop 120. When the bus master request signal B_REQ has been initially issued from the read bus master 2 or when the arbiter acknowledge signal A_AEN has been input from the arbiter 1 if the bus master request signal B_REQ has been re-issued from the read bus master 2, the determination logic 1112 sets the request assert timing signal to a state (hereinafter referred to as a "set state") in which the arbiter request signal A_REQ is output to the arbiter 1.

The request assert timing signal is generated based on the bus master request signal B_REQ input from the read bus master 2, the arbiter acknowledge signal A_AEN input from the arbiter 1, and the arbiter request signal A_REQ output by the flip-flop 1111.

More specifically, the determination logic 1112 sets the request assert timing signal to the set state (for example, a "High" level) in a state (for example, a "Low" level) in which the arbiter request signal A_REQ does not make the access request, and in a state (for example, the "High" level) in which the bus master request signal B_REQ makes the access request. This corresponds to when the bus master request signal B_REQ has been initially issued from the read bus master 2.

In addition, the determination logic 1112 sets the request assert timing signal to the set state (for example, the "High" level) in a state (for example, the "High" level) in which the arbiter acknowledge signal A_AEN permits the access request, in a state (for example, the "High" level) in which the arbiter request signal A_REQ makes the access request, and in a state (for example, the "High" level) in which the bus master request signal B_REQ makes the access request. This corresponds to when the arbiter acknowledge signal A_AEN corresponding to the previous arbiter request signal A_REQ has been input from the arbiter 1 if the bus master request signal B_REQ has been re-issued from the read bus master 2.

In a state other than the above-described two states, the determination logic 1112 does not output the request assert timing signal of the set state. For example, the request assert timing signal is at the "Low" level.

The determination logic 1113 generates a request clear timing signal indicating the timing at which the output of the arbiter request signal A_REQ to the arbiter 1 is stopped, and outputs the generated request clear timing signal to a clear (CLR) terminal of the flip-flop 1111. When the arbiter acknowledge signal A_AEN has been input from the arbiter 1, the determination logic 1113 sets the request clear timing signal to a state (hereinafter referred to as "reset state") in which the output of the arbiter request signal A_REQ to the arbiter 1 is stopped.

The request clear timing signal is generated based on the bus master request signal B_REQ input from the read bus master 2 and the arbiter acknowledge signal A_AEN input from the arbiter 1.

More specifically, the determination logic 1113 sets the request clear timing signal to the reset state (for example, the "High" level) in a state (for example, the "High" level) in which the arbiter acknowledge signal A_AEN permits the access request, and in a state (for example, the "Low" level) in which the bus master request signal B_REQ does not make the access request. This corresponds to when the arbiter acknowledge signal A_AEN corresponding to the last arbiter request signal A_REQ has been input in a state in which the bus master request signal B_REQ has not been re-issued from the read bus master 2.

In a state other than the above-described state, the determination logic 1113 does not output the request clear timing signal of the reset state. For example, the request clear timing signal is at the "Low" level.

The flip-flop 1111 outputs the arbiter request signal A_REQ, which has been generated in correspondence with the request assert timing signal input from the determination logic 1112 to the set (SET) terminal and the request clear timing signal input from the determination logic 1113 to the clear (CLR) terminal, to the arbiter 1.

More specifically, the flip-flop 1111 sets the arbiter request signal A_REQ to a state (for example, the "High" level) in which access to the DRAM is requested in the next clock cycle if the request assert timing signal of the set state is input. In addition, the flip-flop 1111 sets the arbiter request signal A_REQ to a state (for example, the "Low" level) in which the access to the DRAM is not requested, that is, in which the access to the DRAM is stopped, in the next clock cycle if the request clear timing signal of the reset state is input. In addition, the arbiter request signal A_REQ is also output to the determination logic 1112.

Thereby, the bus master request signal B_REQ input from the read bus master 2 is adjusted by the flip-flop 1111 to the timing of the clock cycle, and output to the arbiter 1. That is, the arbiter request signal A_REQ is output to the arbiter 1 at substantially the same timing as when the arbiter request signal A_REQ has been temporarily latched by the flip-flop 1111.

The flip-flop 112 (the address timing adjustment unit 112) latches the bus master address B_ADR input from the read bus master 2 to the data (D) terminal according to the request assert timing signal input from the determination logic 1112 to the enable (EN) terminal, and outputs the latched bus master address B_ADR as the arbiter address A_ADR to the arbiter 1. The flip-flops 112 for the number of bits of the bus master address B_ADR is provided in the control signal transfer module 10.

Thereby, the bus master address B_ADR input from the read bus master 2 simultaneously with the bus master request signal B_REQ is adjusted by the flip-flop 112 to the timing of the clock cycle and output to the arbiter 1. That is, the bus master address B_ADR is output to the arbiter 1 at substantially the same timing as the bus master request signal B_REQ temporarily latched by the flip-flop 112.

The flip-flop 120 (the acknowledge timing adjustment unit 120) latches the request assert timing signal input from the determination logic 1112 to the data (D) terminal, and outputs the latched request assert timing signal as the bus master acknowledge signal B_AEN to the read bus master 2.

Thereby, the bus master acknowledge signal B_AEN is output to the read bus master 2 at the same timing as the timing at which the arbiter request signal A_REQ and the arbiter address A_ADR are output to the arbiter 1. At this timing, the arbiter acknowledge signal A_AEN for the bus master request signal B_REQ currently output to the arbiter 1 is not input from the arbiter 1. That is, at this timing, the bus master acknowledge signal B_AEN to be output to the read bus master 2 is output at the timing before the arbiter acknowledge signal A_AEN is input from the arbiter 1.

Figure 4:
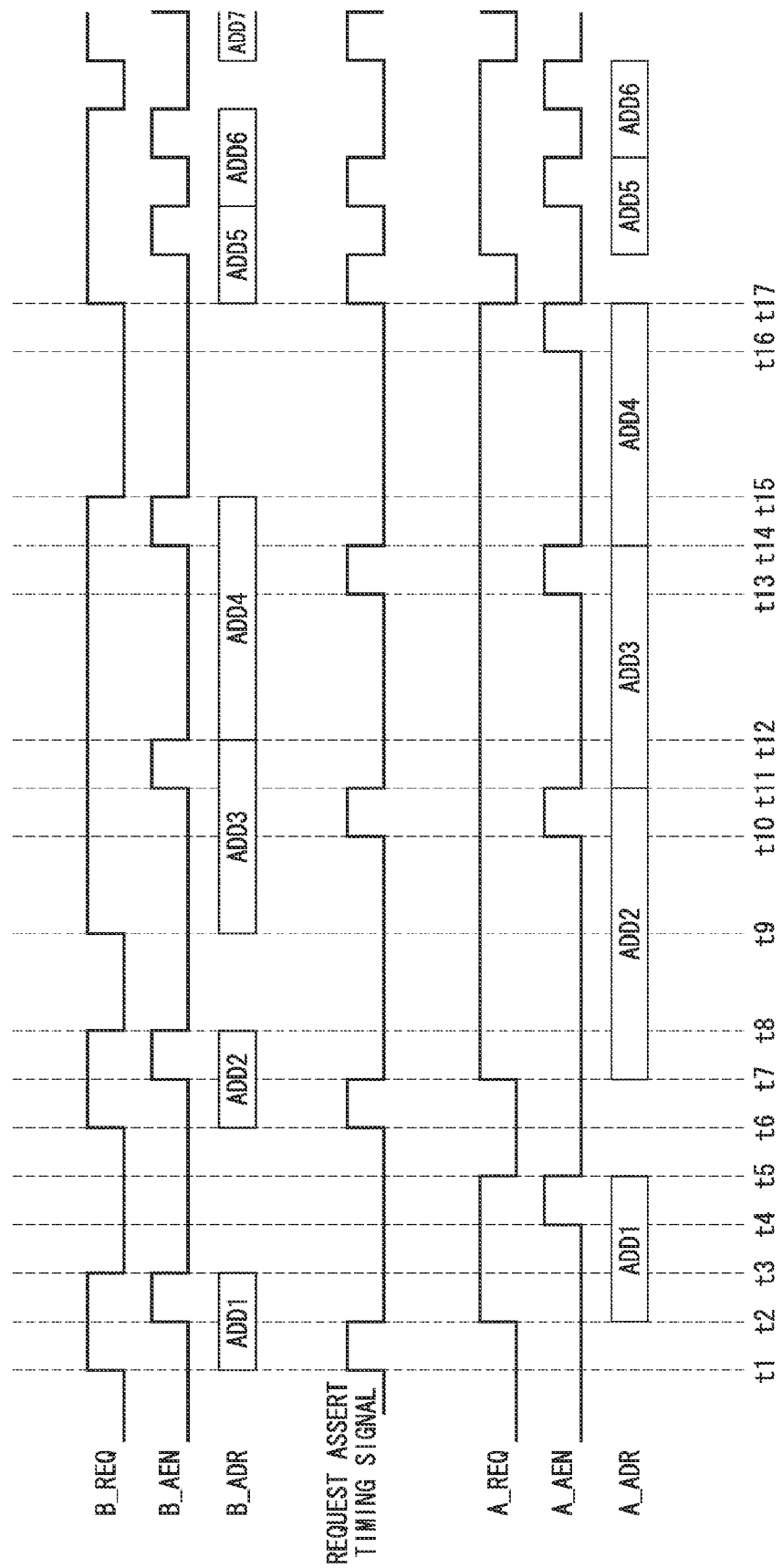
FIG. 4 is a timing chart illustrating an example of timings of the control signal transfer module corresponding to the control signal between the arbiter and the bus master in the signal transfer circuit in accordance with the first preferred embodiment of the present invention.

Here, the operation of the control signal transfer module 10 illustrated in FIG. 3 will be described. FIG. 4 is a timing chart illustrating an example of timings of the control signal transfer module 10 corresponding to control signals between the arbiter and the bus master in the signal transfer circuit in accordance with the first preferred embodiment of the present invention. In the following description, it is described that the bus master request signal B_REQ and the arbiter request signal A_REQ are at the "High" level in a state in which an access request to the DRAM is required, and the arbiter acknowledge signal A_AEN and the bus master acknowledge signal B_AEN are at the "High" level in a state in which the access request to the DRAM is permitted. In addition, it is described that the request assert timing signal is in the reset state at the "High" level.

First, the read bus master 2 issues an initial access request to the DRAM. Thereby, at timing t1, the bus master request signal B_REQ of the "High" level is input to the control signal transfer module 10. At this time, the arbiter request signal A_REQ is at the "Low" level. Thereby, the determination logic 1112 sets the request assert timing signal to the "High" level.

Thereafter, at timing t2, which is the next clock cycle, the flip-flop 1111 outputs the arbiter request signal A_REQ of the "High" level to the arbiter 1. In addition, simultaneously, the flip-flop 112 outputs the arbiter address A_ADR (ADR1) to the arbiter 1. Thereby, the timings of the bus master request signal B_REQ and the bus master address B_ADR (ADR1) output from the read bus master 2 are adjusted and relayed to the arbiter 1.

In addition, simultaneously, the flip-flop 120 outputs the bus master acknowledge signal B_AEN of the "High" level to the read bus master 2. Thereby, the access request to the DRAM output at timing t1 is pre-permitted for the read bus master 2.

In addition, at timing t2, the arbiter request signal A_REQ of the "High" level is input from the flip-flop 1111 to the determination logic 1112. At this time, the arbiter acknowledge signal A_AEN is at the "Low" level. Thereby, the determination logic 1112 sets the request assert timing signal to the "Low" level.

When the read bus master 2 does not continuously access the DRAM, the read bus master 2 stops the issuance of the access request to the DRAM if the bus master acknowledge signal B_AEN of the "High" level is input. Thereby, at timing t3, the bus master request signal B_REQ input to the control signal transfer module 10 is at the "Low" level.

In addition, the determination logic 1112 sets the request assert timing signal to the "Low" level at timing t2, so that the bus master acknowledge signal B_AEN output from the flip-flop 120 is at the "Low" level at timing t3.

Thereafter, if the access request to the DRAM in the arbiter request signal A_REQ is accepted (permitted), the arbiter acknowledge signal A_AEN of the "High" level from the arbiter 1 is input to the control signal transfer module 10 at timing t4. Thereby, the determination logic 1113 sets the request clear timing signal to the "High" level.

Thereafter, at timing t5, which is the next clock cycle, the flip-flop 1111 sets the arbiter request signal A_REQ to the "Low" level. Thereby, the arbiter 1 sets the arbiter acknowledge signal A_AEN to the "Low" level.

In this manner, one access by the read bus master 2 to the DRAM ends. When the read bus master 2 re-accesses the DRAM, the initial access request to the DRAM is re-issued. Thereby, at timing t6, the bus master request signal B_REQ of the "High" level is input to the control signal transfer module 10. At this time, the arbiter request signal A_REQ is at the "Low" level. Thereby, the determination logic 1112 sets the request assert timing signal to the "High" level.

Thereafter, at timing t7, which is the next clock cycle, the flip-flop 1111 outputs the arbiter request signal A_REQ of the "High" level to the arbiter 1. In addition, simultaneously, the flip-flop 112 outputs the arbiter address A_ADR (ADR2) to the arbiter 1. Thereby, the timings of the bus master request signal B_REQ and the bus master address B_ADR (ADR2) output from the read bus master 2 are adjusted and relayed to the arbiter 1.

In addition, simultaneously, the flip-flop 120 outputs the bus master acknowledge signal B_AEN of the "High" level to the read bus master 2. Thereby, the access request to the DRAM output at timing t6 is pre-permitted for the read bus master 2.

In addition, at timing t7, the arbiter request signal A_REQ of the "High" level is input from the flip-flop 1111 to the determination logic 1112. At this time, the arbiter acknowledge signal A_AEN is at the "Low" level. Thereby, the determination logic 1112 sets the request assert timing signal to the "Low" level.

When the read bus master 2 does not continuously access the DRAM, the read bus master 2 stops the issuance of the access request to the DRAM if the bus master acknowledge signal B_AEN of the "High" level is input. Thereby, at timing t8, the bus master request signal B_REQ input to the control signal transfer module 10 is at the "Low" level.

In addition, the determination logic 1112 sets the request assert timing signal to the "Low" level at timing t7, so that the bus master acknowledge signal B_AEN output from the flip-flop 120 is at the "Low" level at timing t8.

Thereafter, when the read bus master 2 accesses the DRAM, the access request to the DRAM is re-issued. Thereby, at timing t9, the bus master request signal B_REQ of the "High" level is input to the control signal transfer module 10. However, at timing t9, the initial access request issued by the read bus master 2 at timing t6 is not accepted by the arbiter 1. That is, the arbiter acknowledge signal A_AEN of the "High" level from the arbiter 1 is not input to the control signal transfer module 10. Thus, the arbiter request signal A_REQ is still at the "High" level. Accordingly, the determination logic 1112 does not set the request assert timing signal to the "High" level. Thereby, the control signal transfer module 10 continues the state of the access request to the DRAM corresponding to the bus master request signal B_REQ issued by the read bus master 2 at timing t6.

Thereafter, if the access request to the DRAM in the arbiter request signal A_REQ output at timing t7 is accepted (permitted), the arbiter acknowledge signal A_AEN of the "High" level from the arbiter 1 is input to the control signal transfer module 10 at timing t10. At this time, the bus master request signal B_REQ is still at the "High" level according to the access request to the DRAM issued at timing t9. Accordingly, the determination logic 1113 does not set the request clear timing signal to the "High" level. That is, the arbiter request signal A_REQ is not set to the reset state.

In addition, the arbiter acknowledge signal A_AEN of the "High" level is input from the arbiter 1, so that the determination logic 1112 sets the request assert timing signal to the "High" level. This corresponds to the access request to the DRAM issued from the read bus master 2 at timing t9.

Thereby, at timing t11, which is the next clock cycle, the "High" level of the arbiter request signal A_REQ output by the flip-flop 1111 is maintained and the continuous access request to the DRAM is output to the arbiter 1.

In addition, at timing t11, the output of the arbiter address A_ADR by the flip-flop 112 is switched to the arbiter address A_ADR (ADR3) corresponding to the access request to the DRAM issued from the read bus master 2 at timing t9 according to a request assert timing signal. Thereby, at timing t9, the timings of the bus master request signal B_REQ and the bus master address B_ADR (ADR3) output from the read bus master 2 are adjusted and relayed to the arbiter 1.

In addition, simultaneously, the flip-flop 120 outputs the bus master acknowledge signal B_AEN of the "High" level to the read bus master 2. Thereby, the access request to the DRAM output at timing t9 is pre-permitted for the read bus master 2.

Thereafter, at timing t12, which is the next clock cycle, the flip-flop 120 sets the bus master acknowledge signal B_AEN to the "Low" level according to the "Low" level of the request assert timing signal.

In addition, when the read bus master 2 continuously accesses the DRAM after the bus maser acknowledge signal B_AEN of the "High" level has been input to the read bus master 2, the issuance of the access request to the DRAM is not stopped and the "High" level of the bus master request signal B_REQ continues. Thereby, even at timing t12, the bus master request signal B_REQ of the "High" level is input to the control signal transfer module 10. However, at timing t12, the arbiter 1 does not accept a second access request issued by the read bus master 2 at timing t9. That is, the arbiter acknowledge signal A_AEN of the "High" level from the arbiter 1 is not input to the control signal transfer module 10. Thus, the arbiter request signal A_REQ is still at the "High" level. Accordingly, the determination logic 1112 does not set the request assert timing signal to the "High" level. Thereby, the control signal transfer module 10 continues the state of the access request to the DRAM corresponding to the bus master request signal B_REQ issued by the read bus master 2 at timing t9.

Thereafter, if the access request to the DRAM in the arbiter request signal A_REQ output at timing t11 is accepted (permitted), the arbiter acknowledge signal A_AEN of the "High" level from the arbiter 1 is input to the control signal transfer module 10 at timing t13. At this time, according to the access request to the DRAM issued at timing t12, the bus master request signal B_REQ is still at the "High" level. Accordingly, the determination logic 1113 does not set the request clear timing signal to the "High" level, and does not set the arbiter request signal A_REQ to the reset state.

In addition, the arbiter acknowledge signal A_AEN of the "High" level is input from the arbiter 1, so that the determination logic 1112 sets the request assert timing signal to the "High" level. This corresponds to the access request to the DRAM issued from the read bus master 2 at timing t12.

Thereby, at timing t14, which is the next clock cycle, the "High" level of the arbiter request signal A_REQ output by the flip-flop 1111 is maintained, and the continuous access request to the DRAM is output to the arbiter 1.

In addition, at timing t14, the output of the arbiter address A_ADR by the flip-flop 112 is switched to the arbiter address A_ADR (ADR4) corresponding to the access request to the DRAM issued from the read bus master 2 at timing t12 according to a request assert timing signal. Thereby, at timing t12, the timings of the bus master request signal B_REQ and the bus master address B_ADR (ADR4) output from the read bus master 2 are adjusted and relayed to the arbiter 1.

In addition, simultaneously, the flip-flop 120 outputs the bus master acknowledge signal B_AEN of the "High" level to the read bus master 2. Thereby, the access request to the DRAM output at timing t12 is pre-permitted for the read bus master 2.

When the read bus master 2 does not continuously access the DRAM, the read bus master 2 stops the issuance of the access request to the DRAM if the bus master acknowledge signal B_AEN is input. Thereby, at timing t15, the bus master request signal B_REQ input to the control signal transfer module 10 is set to the "Low" level.

In addition, at timing t15, the flip-flop 120 sets the bus master acknowledge signal B_AEN to the "Low" level according to the "Low" level of the request assert timing signal.

Thereafter, if the access request to the DRAM in the arbiter request signal A_REQ output at timing t14 is accepted (permitted), the arbiter acknowledge signal A_AEN of the "High" level from the arbiter 1 is input to the control signal transfer module 10 at timing t16. Thereby, the determination logic 1113 sets the request clear timing signal to the "High" level.

Thereafter, at timing t17, which is the next clock cycle, the flip-flop 1111 sets the arbiter request signal A_REQ to the "Low" level. Thereby, the arbiter 1 sets the arbiter acknowledge signal A_AEN to the "Low" level.

In this manner, even in a state in which the access request to the DRAM is not permitted, the read bus master 2 can continuously issue the access request to the DRAM and access the DRAM. When the access request to the DRAM has been re-issued from the read bus master 2 after the flip-flop 1111 has set the arbiter request signal A_REQ to the "Low" level, the input bus master request signal B_REQ of the "High" level operates as the initial access request to the DRAM as illustrated after timing t17 of FIG. 4 or later. Because an operation of the control signal transfer module 10 illustrated after timing t17 of FIG. 4 or later is the same as the operation described with reference to timings t1 to t17 of FIG. 4, a detailed description of the timings is omitted here.

As described above, the control signal transfer module 10 makes an output to the arbiter 1 by adjusting the timings of a bus master request signal B_REQ and a bus master address B_ADR issued (output) from the read bus master 2 to the arbiter 1. In addition, the control signal transfer module 10 permits the access request to the DRAM for the read bus master 2 at the timing before the arbiter acknowledge signal A_AEN returned (output) from the arbiter 1 to the read bus master 2. Thereby, the control signal transfer module 10 can relay each signal in a state in which a predetermined protocol has been kept between the arbiter 1 and the read bus master 2. Thereby, it is possible to set the timing of a signal between the arbiter 1 and the bus master 2, for example, to substantially the same state as when the flip-flop has been inserted, after a predetermined protocol has been kept between the control signal transfer module 10 and the arbiter 1 and between the bus master and the control signal transfer module 10. Thereby, the control signal transfer module 10 alleviates a limitation of a signal delay time which is caused because a layout position of the arbiter 1 within the system LSI and a layout position of the read bus master 2 are away from each other or a clock cycle is shortened by speeding up an operation clock of the system LSI.

Figure 5:
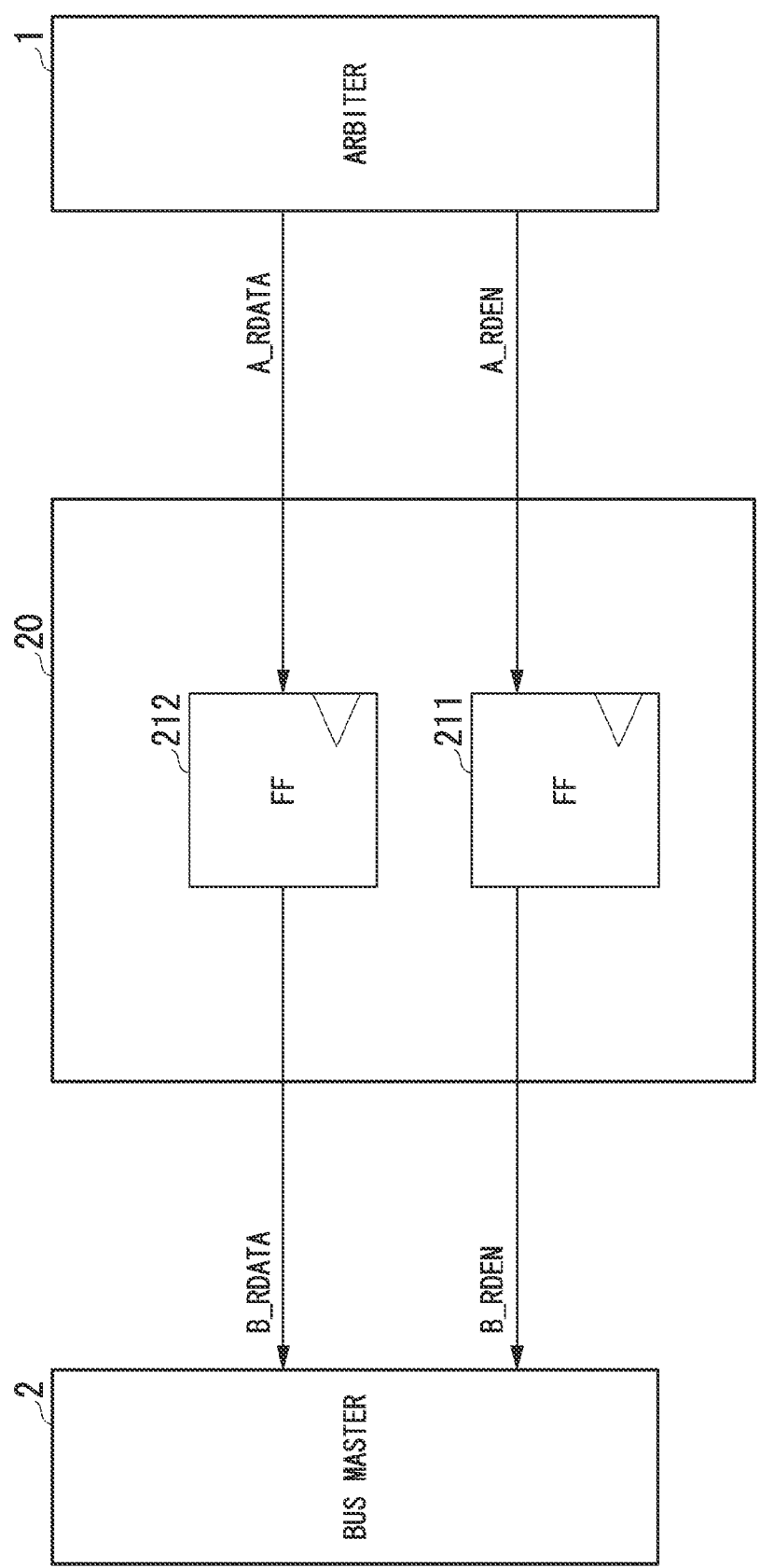
FIG. 5 is a block diagram illustrating a schematic configuration of a read data transfer module corresponding to the bus master that reads data from a DRAM in the signal transfer circuit in accordance with the first preferred embodiment of the present invention.

Next, the read data transfer module 20 will be described. FIG. 5 is a block diagram illustrating a schematic configuration of the read data transfer module 20 corresponding to a bus master that reads data from the DRAM in the signal transfer circuit in accordance with the first preferred embodiment of the present invention. In FIG. 5, the read data transfer module 20 inserted between the arbiter 1 and the read bus master 2 is illustrated.

The read data transfer module 20 includes a data enable timing adjustment unit 211 and a read data timing adjustment unit 212 as the timing adjustment unit 210.

The read data transfer module 20 adjusts the timing in the data enable timing adjustment unit 211, and outputs the data enable (DEN) signal input from the arbiter 1 to the read bus master 2. The data enable timing adjustment unit 211, for example, temporarily latches the data enable (DEN) signal, and outputs the latched data enable (DEN) signal to the read bus master 2. In addition, the read data transfer module 20 adjusts the timing in the read data timing adjustment unit 212, and outputs the read data (RDATA) input from the arbiter 1 to the read bus master 2 simultaneously with the data enable (DEN) signal. The read data timing adjustment unit 212, for example, temporarily latches the read data (RDATA), and outputs the latched read data (RDATA) to the read bus master 2.

As described above, the data enable (DEN) signal and the read data (RDATA) input from the arbiter 1 are adjusted to the timing of the clock cycle by the read data transfer module 20, and relayed to the arbiter 1. Thereby, it is possible to set the timing of a signal between the arbiter 1 and the read bus master 2, for example, to substantially the same state as when the flip-flop has been inserted, after a predetermined protocol between the arbiter 1 and the read bus master 2 has been kept between the read data transfer module 20 and the arbiter 1 and between the read bus master 2 and the read data transfer module 20 by inserting the read data transfer module 20 between the arbiter 1 and the bus master 2.

In the following description, the data enable (DEN) signal and the read data (RDATA) input from the arbiter 1 are referred to as an arbiter data read enable signal A_RDEN and arbiter read data A_RDATA, respectively. In addition, the data enable (DEN) signal and the read data (RDATA) output to the read bus master 2 are referred to as a read bus master data enable signal B_RDEN and bus master read data B_RDATA, respectively.

In the read data transfer module 20, the data enable timing adjustment unit 211 and the read data timing adjustment unit 212 are each constituted of a flip-flop. In the following description, the data enable timing adjustment unit 211 is also referred to as the flip-flop 211 and the read data timing adjustment unit 212 is also referred to as the flip-flop 212.

The flip-flop 211 (the data enable timing adjustment unit 211) latches the arbiter data read enable signal A_RDEN input from the arbiter 1, and outputs the latched arbiter data read enable signal A_RDEN as the read bus master data enable signal B_RDEN to the read bus master 2.

The flip-flop 212 (the read data timing adjustment unit 212) latches the arbiter read data A_RDATA input from the arbiter 1, and outputs the latched arbiter read data A_RDATA as the bus master read data B_RDATA to the read bus master 2. The flip-flops 212 for the number of bits of the arbiter read data A_RDATA are provided in the read data transfer module 20.

Because the flip-flop 211 and the flip-flop 212 only temporarily latch the arbiter data read enable signal A_RDEN and the arbiter read data A_RDATA input from the arbiter 1, respectively, and output the arbiter data read enable signal A_RDEN and the arbiter read data A_RDATA as the read bus master data enable signal B_RDEN and the bus master read data B_RDATA in the operation of the read data transfer module 20 illustrated in FIG. 5, a detailed description of the timings is omitted here.

As described above, the read data transfer module 20 makes an output to the read bus master 2 by adjusting the timings of the arbiter data read enable signal A_RDEN and the arbiter read data A_RDATA input from the arbiter 1. Thereby, the read data transfer module 20 can relay each signal in a state in which a predetermined protocol has been kept between the arbiter 1 and the read bus master 2. Thereby, it is possible to set the timing of a signal between the arbiter 1 and the read bus master 2, for example, to substantially the same state as when the flip-flop has been inserted, after a predetermined protocol has been kept between the read data transfer module 20 and the arbiter 1 and between the read bus master 2 and the read data transfer module 20. Thereby, the read signal transfer module 20 alleviates a limitation of a signal delay time which is caused because a layout position of the arbiter 1 within the system LSI and a layout position of the read bus master 2 are away from each other or a clock cycle is shortened by speeding up an operation clock of the system LSI.

Figure 6:
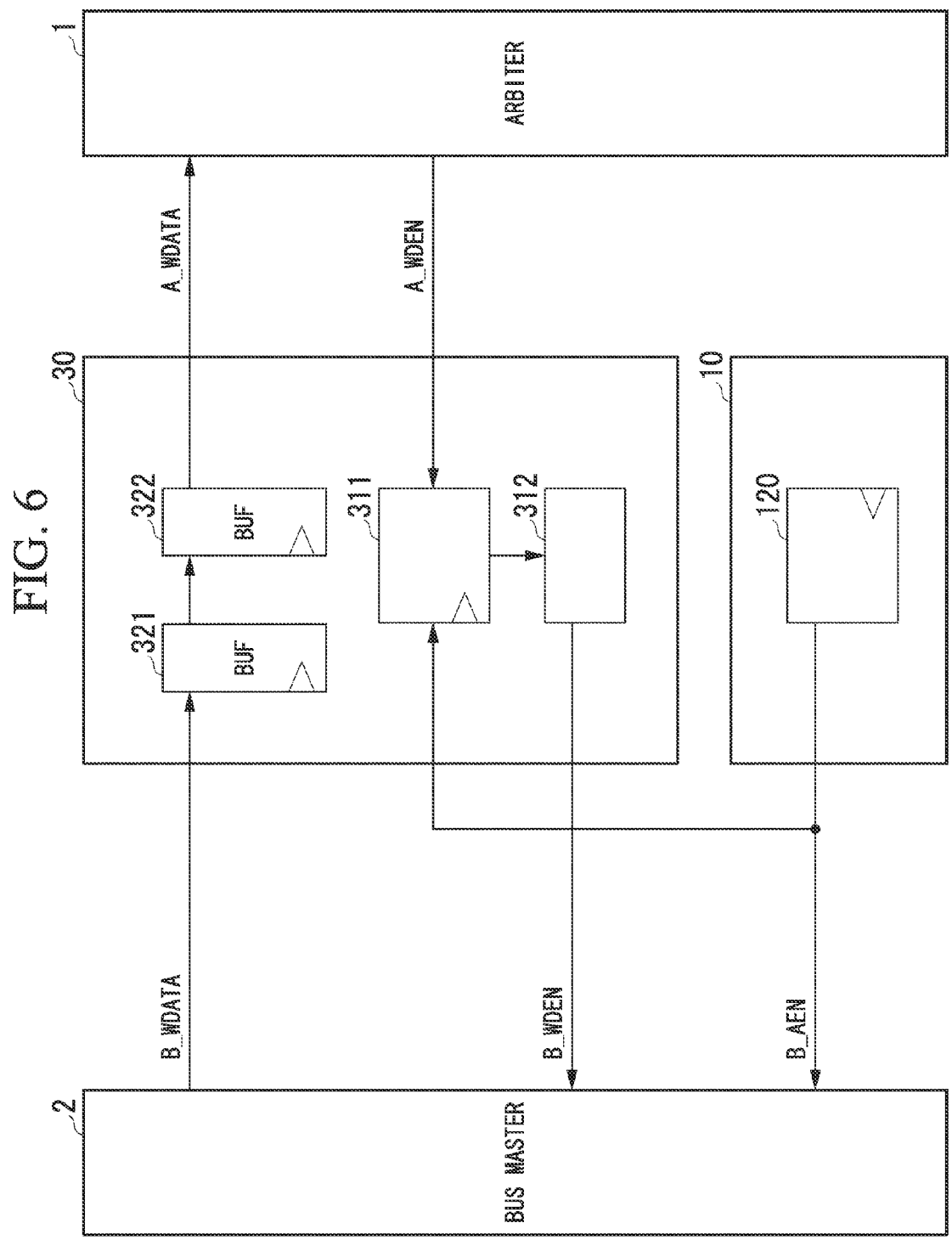
FIG. 6 is a block diagram illustrating a schematic configuration of a write data transfer module corresponding to the bus master that writes data to the DRAM in the signal transfer circuit in accordance with the first preferred embodiment of the present invention.

Next, the write data transfer module 30 will be described. FIG. 6 is a block diagram illustrating a schematic configuration of the write data transfer module 30 corresponding to a bus master that writes data to the DRAM in the signal transfer circuit in accordance with the first preferred embodiment of the present invention. In FIG. 6, the write data transfer module 30 inserted between the arbiter 1 and the write bus master 3 is illustrated. Because an operation is also performed using the bus master acknowledge signal B_AEN output from the control signal transfer module 10 in the write data transfer module 30, part (the acknowledge timing adjustment unit 120) of the control signal transfer module 10 related to the write data transfer module 30 is also illustrated.

The write data transfer module 30 includes an acknowledge measurement unit 311 and a data enable adjustment unit 312 as the timing adjustment unit 310 and write data buffers 321 and 322 as the timing adjustment unit 320.

The write data transfer module 30 outputs a data enable (DEN) signal generated by the data enable adjustment unit 312 to the write bus master 3 in a clock cycle after the bus master acknowledge signal B_AEN has been output from the control signal transfer module 10. Thereby, the data enable (DEN) signal is input to the write bus master 3 at the timing before the arbiter 1 outputs the data enable (DEN) signal, that is, at an early timing. The number of data enable (DEN) signals to be output early from the write data transfer module 30 to the write bus master 3 is same as the number of write data (WDATA) capable of being latched within the write data transfer module 30. Thereafter, when the data enable (DEN) signal has been output from the arbiter 1, the remaining data enable (DEN) signal is output to the write bus master 3.

In the following description, the data enable (DEN) signal input from the arbiter 1 is referred to as an arbiter data write enable signal A_WDEN, and the data enable (DEN) signal output to the write bus master 3 is referred to as a write bus master data enable signal B_WDEN.

In addition, the write data transfer module 30 temporarily latches the write data (WDATA) input from the write bus master 3 in the write data buffer 321 or 322 according to the early output write bus master data enable signal B_WDEN, and outputs the latched write data (WDATA) to the arbiter 1 in time with the arbiter data write enable signal A_WDEN. In addition, the write data (WDATA) input from the write bus master 3 according to the remaining write bus master data enable signal B_WDEN output at the timing after the arbiter data write enable signal A_WDEN is input is also temporarily latched in the write data buffer 321 or 322, and then output to the arbiter 1 in time with the arbiter data write enable signal A_WDEN. Thereby, the write data (WDATA) input from the write bus master 3 is adjusted by the write data transfer module 30 to the timing of the clock cycle, and relayed to the arbiter 1.

In the following description, the write data (WDATA) input from the write bus master 3 is referred to as bus master write data B_WDATA, and the write data (WDATA) output to the arbiter 1 is referred to as arbiter write data A_WDATA.

According to this operation, the write data transfer module 30 relays the data enable (DEN) signal issued (output) from the arbiter 1 to the write bus master 3 and the write data (WDATA) output from the write bus master 3 to the arbiter 1. Thereby, it is possible to set the timing of a signal between the arbiter 1 and the write bus master 3, for example, to substantially the same state as when the flip-flop has been inserted, after a predetermined protocol between the arbiter 1 and the write bus master 3 has been kept between the write data transfer module 30 and the arbiter 1 and between the write bus master 3 and the write data transfer module 30 by inserting the write data transfer module 30 between the arbiter 1 and the bus master 3.

Figure 7:
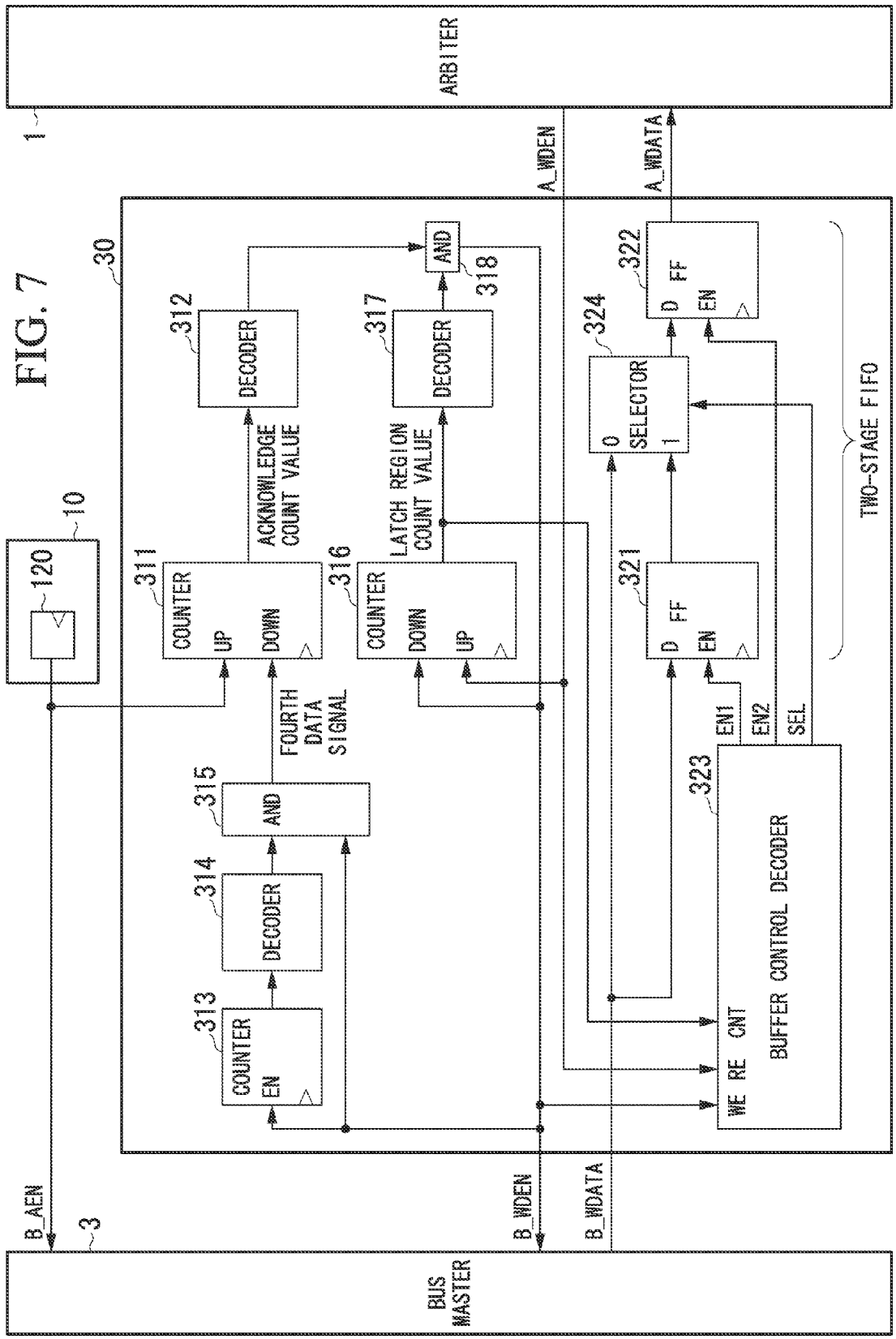
FIG. 7 is a circuit diagram illustrating an example of a configuration of the write data transfer module corresponding to the bus master that writes data to the DRAM in the signal transfer circuit in accordance with the first preferred embodiment of the present invention.

Next, a detailed configuration of the write data transfer module 30 will be described. FIG. 7 is a circuit diagram illustrating an example of the configuration of the write data transfer module 30 corresponding to the bus master that writes data to the DRAM in the signal transfer circuit in accordance with the first preferred embodiment of the present invention. In FIG. 7, as in FIG. 6, the write data transfer module 30 inserted between the arbiter 1 and the write bus master 3 and a circuit (the acknowledge timing adjustment unit 120: the flip-flop 120) of part of the control signal transfer module 10 related to the write data transfer module 30 are illustrated together. In the following description, the case in which the write data transfer module 30 copes with four-burst write data WDATA will be described.

In the write data transfer module 30, the timing adjustment unit 310 includes an acknowledge measurement unit 311, a data enable adjustment unit 312, a counter 313, a decoder 314, an AND logic 315, a counter 316, a decoder 317, and an AND logic 318. In addition, the timing adjustment unit 320 includes write data buffers 321 and 322, a buffer control decoder 323, and a selector 324. The acknowledge measurement unit 311 and the data enable adjustment unit 312 are constituted of a counter and a decoder, respectively. In the following description, the acknowledge measurement unit 311 is also referred to as the counter 311, and the data enable adjustment unit 312 is also referred to as the decoder 312. In addition, the write data buffers 321 and 322 are each constituted of a flip-flop. In the following description, the write data buffer 321 is also referred to as the flip-flop 321, and the write data buffer 322 is also referred to as the flip-flop 322.

The counter 313 counts the write bus master data enable signal B_WDEN, output by the write data transfer module 30, input to the enable (EN) terminal for every clock cycle, and outputs a count value of the counting result to the decoder 314. More specifically, because the write data transfer module 30 copes with the four-burst write data (WDATA), the counter 313 outputs a count value of "0" to "3" to the decoder 314.

The decoder 314 decodes a predetermined count value from a count value of a write bus master data enable signal B_WDEN input from the counter 313, and outputs the decoding result to the AND logic 315. More specifically, the decoder 314 outputs a decode signal (for example, the "High" level) indicating that the count value is "3" to the AND logic 315. This is because the write data transfer module 30 copes with four-burst write data WDATA. The decoder 314 decodes a fourth clock cycle of the write bus master data enable signal B_WDEN.

The AND logic 315 outputs a fourth data signal, which is a result obtained by carrying out a logical AND operation on the write bus master data enable signal B_WDEN and the decode signal input from the decoder 314, to a count-down (DOWN) terminal of the counter 311. Here, the fourth data signal output from the AND logic 315 is a signal indicating that the fourth clock cycle when the write bus master data enable signal B_WDEN is output, that is, fourth bus master write data B_WDATA within four-burst bus master write data B_WDATA, is input from the write bus master 3.

The counter 311 (the acknowledge measurement unit 311) counts the number of access requests in which the control signal transfer module 10 outputs the bus master acknowledge signal B_AEN to the write bus master 3, but the write data transfer module 30 does not output the arbiter write data A_WDATA, and outputs an acknowledge count value, which is the counting result, to the decoder 312. That is, the counter 311 counts the number of access requests in which an operation corresponding to an access request to the DRAM by the write bus master 3 is not completed, and outputs the counted number of access requests to the decoder 312.

More specifically, the counter 311 counts up the acknowledge count value according to the bus master acknowledge signal B_AEN, which is output by the control signal transfer module 10, input to a count-up (UP) terminal, and counts down the acknowledge count value according to a fourth data signal input to the count-down (DOWN) terminal. That is, the acknowledge count value is counted up when the control signal transfer module 10 has output the bus master acknowledge signal B_AEN, and the acknowledge count value is counted down when fourth bus master write data B_WDATA has been input to the write data transfer module 30. At this time, the acknowledge count value serves as the number of access requests in which access to the DRAM is not completed.

In a state in which the bus master acknowledge signal B_AEN input to the count-up (UP) terminal is counted up and the fourth data signal input to the count-down (DOWN) terminal is counted down, the counter 311 retains a current acknowledge count value.

The decoder 312 (the data enable adjustment unit 312) decodes a predetermined count value from the acknowledge count value input from the counter 311, and outputs the decoding result to the AND logic 318. More specifically, the decoder 314 outputs a decode signal (for example, the "High" level) indicating that the acknowledge count value is a value other than "0" to the AND logic 318. The decode signal having the "High" level indicates that there is an access request in which the bus master acknowledge signal B_AEN has already been output from the control signal transfer module 10. Thereby, it is possible to determine whether or not an access request necessary for the write data transfer module 30 to output the arbiter write data A_WDATA remains.

The counter 316 counts the number of bus master write data B_WDATA latched in the timing adjustment unit 320, and outputs a latch region count value, which is the counting result, to the decoder 317. Here, the latch region count value output from the counter 316 is a count value indicating the number of bus master write data B_WDATA capable of being latched in a latch region of the timing adjustment unit 320, that is, the number of empty regions of the timing adjustment unit 320. In addition, the latch region count value output by the counter 316 is also output to a count (CNT) terminal of the buffer control decoder 323.

More specifically, the counter 316 counts up the latch region count value for every clock cycle according to an arbiter data enable signal A_WDEN input to the count-up (UP) terminal, and counts down the latch region count value for every clock cycle according to the write bus master data enable signal B_WDEN input to the count-down (DOWN) terminal. That is, the counter 316 counts down the number of empty regions of the timing adjustment unit 320 if the bus master write data B_WDATA is input according to the write bus master data enable signal B_WDEN, and latched in a latch region of the timing adjustment unit 320. In addition, if the bus master write data B_WDATA latched in the latch region of the timing adjustment unit 320 according to the arbiter data enable signal A_WDEN is output as the arbiter write data A_WDATA, the number of empty regions of the timing adjustment unit 320 is counted up.

In the write data transfer module 30, two latch regions (the write data buffers 321 and 322) are provided in the timing adjustment unit 320. Thus, a value when the bus master write data B_WDATA is not latched in the latch region of the timing adjustment unit 320, that is, an initial value of the latch region count value output by the counter 316, is "2." The counter 316 outputs count values of "0" (indicating that there is no empty region), "1" (indicating that there is one empty region), and "2" (indicating that there are two empty regions) as latch region count values to the decoder 317 and the buffer control decoder 323 according to the number of empty regions of the timing adjustment unit 320.

In a state in which the arbiter data enable signal A_WDEN input to the count-up (UP) terminal is counted up and the write bus master data enable signal B_WDEN input to the count-down (DOWN) terminal is counted down, the counter 311 retains a current latch region count value.

The decoder 317 decodes a predetermined count value from the latch region count value input from the counter 316, and outputs the decoding result to the AND logic 318. More specifically, the decoder 317 outputs the decode signal (for example, the "High" level) indicating that the latch region count value is a value other than "0" (indicating that there is no empty region), that is, indicating that there is an empty region in the timing adjustment unit 320, to the AND logic 318. The decode signal at the "High" level indicates that there is an empty region in the timing adjustment unit 320.

The AND logic 318 outputs a result obtained by carrying out a logical AND operation on the decode signal output from the decoder 312 and the decode signal output from the decoder 317 as the write bus master data enable signal B_WDEN to the write bus master 3. The write bus master data enable signal B_WDEN output from the AND logic 318 indicates that the bus master acknowledge signal B_AEN is output to the write bus master 3 and there is an empty region in the timing adjustment unit 320. In addition, as described above, the write bus master data enable signal B_WDEN output by the AND logic 318 is also output to the enable (EN) terminal of the counter 313, the AND logic 315, and the count-down (DOWN) terminal of the counter 316. In addition, the write bus master data enable signal B_WDEN is also output to a write enable (WE) terminal of the buffer control decoder 323.

The flip-flop 321 (the write data buffer 321) temporarily latches the bus master write data B_WDATA from the write bus master 3 input to a data (D) terminal according to a latch enable signal EN1 from the buffer control decoder 323 input to the enable (EN) terminal. The flip-flop 321 outputs the latched bus master write data B_WDATA (hereinafter referred to as "latch data L_DATA") to the selector 324. The flip-flop 321 for the number of bits of the bus master write data B_WDATA is provided in the write data transfer module 30.

The selector 324 outputs data (hereinafter referred to as "select data S_DATA") of either the bus master write data B_WDATA input from the write bus master 3 or the latched data L_DATA output from the flip-flop 321 to the flip-flop 322 according to a select signal SEL input from the buffer control decoder 323. The selector 324 for the number of bits of the bus master write data B_WDATA is provided in the write data transfer module 30.

The flip-flop 322 (the write data buffer 322) temporarily latches the select data S_DATA from the selector 324 input to the data (D) terminal according to the latch enable signal EN2 from the buffer control decoder 323 input to the enable (EN) terminal. The flip-flop 322 outputs the latched select data S_DATA as the arbiter write data A_WDATA to the arbiter 1. The flip-flop 322 for the number of bits of the bus master write data B_WDATA is provided in the write data transfer module 30.

According to the configurations of the flip-flop 321, the selector 324, and the flip-flop 322 in the timing adjustment unit 320, a function of a two-stage First In, First Out (FIFO) memory that sequentially latches and outputs the bus master write data B_WDATA input from the write bus master 3 is implemented. Thereby, it is possible to retain two-burst bus master write data B_WDATA among bus master write data B_WDATA in four bursts from the write bus master 3. In the following description, the flip-flop 321, the selector 324, and the flip-flop 322 are also referred to collectively as the FIFO memory.

The arbiter write data A_WDATA is output constantly from the same latch region of the FIFO memory, that is, the flip-flop 322. This is because the timing at which the arbiter write data A_WDATA is output is adjusted to the timing of the clock cycle. However, the latch region of the FIFO memory to which the bus master write data B_WDATA is input is not constantly the same latch region, and changes according to a state of an empty region within the FIFO memory or a timing at which the arbiter write data A_WDATA is output. That is, when the bus master write data B_WDATA is latched, one of the flip-flop 321 and the flip-flop 322 is configured to be selected, and the bus master write data B_WDATA is configured to be latched in the selected flip-flop. When the bus master write data B_WDATA is latched in the FIFO memory, control is performed by the buffer control decoder 323.

The configuration of the FIFO memory is not limited to the above-described configuration. For example, if a delay time of the selector that selects the latch region from which the arbiter write data A_WDATA is output is small and a timing at which the arbiter write data A_WDATA is output can be adjusted to the timing of a clock cycle, the FIFO memory may be configured to select the latch region when the bus master write data B_WDATA is alternately latched and the arbiter write data A_WDATA is output.

The buffer control decoder 323 controls selection of the latch region when the bus master write data B_WDATA input from the write bus master 3 is latched in the FIFO memory provided in the timing adjustment unit 320 and controls an output when the bus master write data B_WDATA latched in the FIFO memory is output as the arbiter write data A_WDATA to the arbiter 1. More specifically, the buffer control decoder 323 controls the FIFO memory based on the latch region count value input from the counter 316 to the count (CNT) terminal, the write bus master data enable signal B_WDEN from the AND logic 318 to the write enable (WE) terminal, and the arbiter data write enable signal A_WDEN input from the arbiter 1 to the read enable (RE) terminal.

The buffer control decoder 323 outputs a latch enable signal EN1 for controlling the FIFO memory to the enable (EN) terminal of the flip-flop 321, outputs a latch enable signal EN2 to the enable (EN) terminal of the flip-flop 322, and outputs a select signal SEL to the selector 324.

The buffer control decoder 323 controls the FIFO memory based on a truth table illustrated in FIG. 8. FIG. 8 is a truth table illustrating a control method when the write data transfer module 30 corresponding to the bus master that writes data to the DRAM latches the data to be written to the DRAM in the signal transfer circuit in accordance with the first preferred embodiment of the present invention. In the truth table illustrated in FIG. 8, a state indicated by "X" is a logical state that does not occur in the write data transfer module 30.

As illustrated in FIG. 8, the buffer control decoder 323 controls the FIFO memory according to states of the count (CNT) terminal, the write enable (WE) terminal, and the read enable (RE) terminal. In the truth table illustrated in FIG. 8, a numeric value of count (CNT) is a latch region count value, that is, the number of empty regions of the FIFO memory. In addition, a write enable (WE) value of "1" indicates a state in which the write bus master data enable signal B_WDEN is at the "High" level, that is, a state in which the bus master write data B_WDATA is input. In addition, a read enable (RE) value of "1" indicates a state in which the arbiter data write enable signal A_WDEN is at the "High" level, that is, a state in which the arbiter write data A_WDATA is output.

In addition, in the truth table illustrated in FIG. 8, an enable (EN1) value of "1" indicates that the latch enable signal EN1 (for example, the "High" level) is output in a state in which the bus master write data B_WDATA is temporarily latched in the flip-flop 321. In addition, an enable (EN2) value of "1" indicates that the latch enable signal EN2 (for example, the "High" level) is output in a state in which the select data S_DATA is temporarily latched in the flip-flop 322. In addition, a select (SEL) value of "0" indicates that the select signal SEL (for example, the "Low" level) is output to select the bus master write data B_WDATA as the select data S_DATA output to the flip-flop 322, and a select (SEL) value of "1" indicates that the select signal SEL (for example, the "High" level) is output to select the latch data L_DATA as the select data S_DATA.

As illustrated in FIG. 8, for example, when Count (CNT)="1," Write Enable (WE)="1," and Read Enable (RE)="0," Latch Enable Signal EN1="1," Latch Enable Signal EN2="0," and Select Signal SEL="0," so that the bus master write data B_WDATA is temporarily latched in the flip-flop 321.

In addition, for example, when Count (CNT)="2" and Write Enable (WE)="1," Latch Enable Signal EN1="0," Latch Enable Signal EN2="1," and Select Signal SEL="0," so that the bus master write data B_WDATA is temporarily latched in the flip-flop 322. The bus master write data B_WDATA latched in the flip-flop 322 is output as the arbiter write data A_WDATA to the arbiter 1.

In addition, for example, when Count (CNT)="0" and Read Enable (RE)="1," Latch Enable Signal EN1="0," Latch Enable Signal EN2="1," and Select Signal SEL="1," so that the latch data L_DATA is temporarily latched in the flip-flop 322. Thereby, the bus master write data B_WDATA previously latched by the flip-flop 321 is transferred to the flip-flop 322. The latched data L_DATA transferred to the flip-flop 322 is output as the arbiter write data A_WDATA to the arbiter 1.

In addition, for example, when Count (CNT)="1," Write Enable (WE)="1," and Read Enable (RE)="1," Latch Enable Signal EN1="0," Latch Enable Signal EN2="1," and Select Signal SEL="0," so that the bus master write data B_WDATA is temporarily latched in the flip-flop 322, and also output as the arbiter write data A_WDATA to the arbiter 1.

Figure 9:
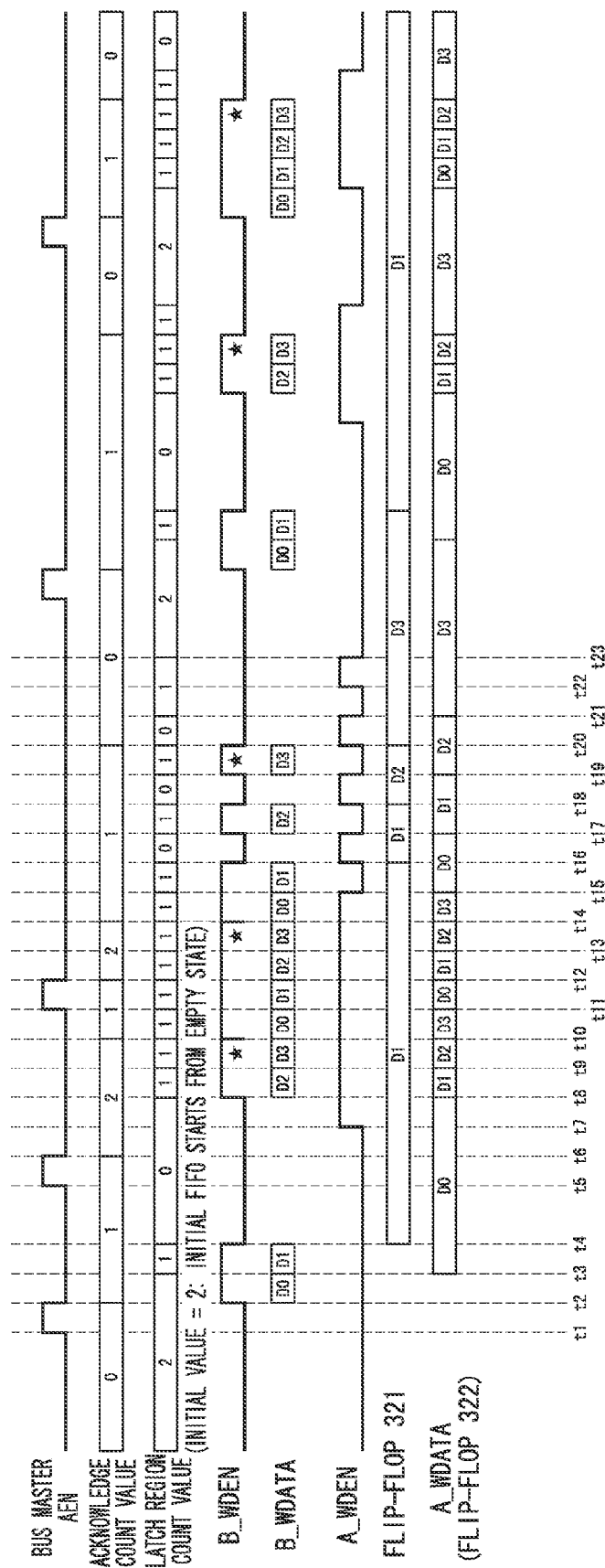
FIG. 9 is a timing chart illustrating an example of timings of the write data transfer module corresponding to the bus master that writes data to the DRAM in the signal transfer circuit in accordance with the first preferred embodiment of the present invention.
Figure 10B:
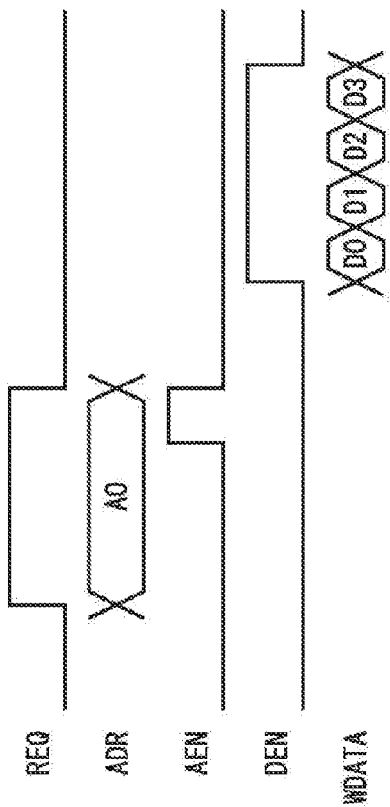
FIGS. 10A and 10B are diagrams illustrating examples of configurations and control timings of an arbiter and bus masters in a system LSI in accordance with the related art.
Figure 10A:
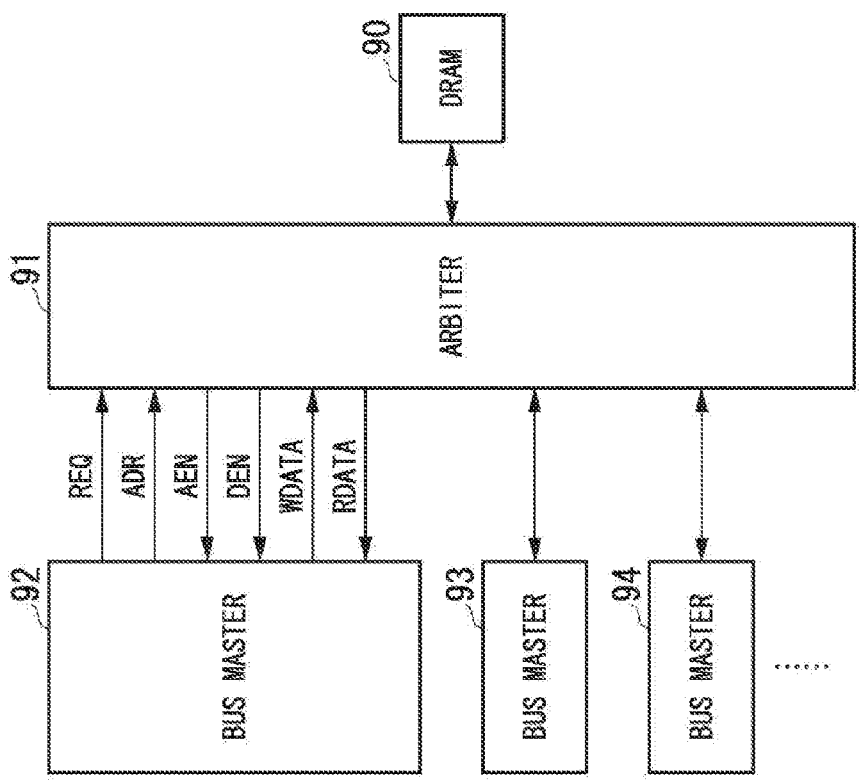

Here, an operation of the write data transfer module 30 illustrated in FIG. 7 will be described. FIG. 9 is a timing chart illustrating an example of timings of the write data transfer module 30 corresponding to the bus master that writes data to the DRAM in the signal transfer circuit in accordance with the first preferred embodiment of the present invention. In the following description, a state in which an access request to the DRAM is permitted when the bus master acknowledge signal B_AEN is at the "High" level and a state in which writing of data to the DRAM is valid when the write bus master data enable signal B_WDEN and the arbiter data write enable signal A_WDEN are at the "High" level will be described.

First, in an initial state of the write data transfer module 30, an acknowledge count value of the counter 311 is "0." In addition, the latch region count value of the counter 316 is "2" (indicating that there are two empty regions).

Thereafter, if the control signal transfer module 10 outputs the bus master acknowledge signal B_AEN of the "High" level to the write bus master 3 at timing t1, the counter 311 sets an acknowledge count value to "1" by counting up the acknowledge count value according to the bus master acknowledge signal B_AEN input to the count-up (UP) terminal at timing t2, which is the next clock cycle. Thereby, the decode signal of the decoder 312 is at the "High" level. At this time, because the latch region count value is "2" (indicating that there are two empty regions), the decode signal of the decoder 317 is also at the "High" level. Thereby, the write bus master data enable signal B_WDEN of the "High" level is output from the AND logic 318 to the write bus master 3. That is, the write bus master data enable signal B_WDEN is output to the write bus master 3 in advance.

Thereafter, the write bus master data enable signal B_WDEN is at the "High" level, so that the buffer control decoder 323 causes the flip-flop 322 to temporarily latch the bus master write data B_WDATA (D0) input from the write bus master 3 at timing t3, which is the next clock cycle. Thereby, the bus master write data B_WDATA (D0) latched in the flip-flop 322 is output as the arbiter write data A_WDATA (D0) to the arbiter 1.

In addition, because the write bus master data enable signal B_WDEN is at the "High" level at timing t3, the counter 316 counts down the latch region count value to "1" (indicating that there is one empty region).

Thereafter, at timing t4, which is the next clock cycle, the buffer control decoder 323 causes the flip-flop 321 to temporarily latch the bus master write data B_WDATA (D1) input from the write bus master 3.

In addition, because the write bus master data enable signal B_WDEN is at the "High" level at timing t4, the counter 316 counts down the latch region count value to "0" (indicating that there is no empty region). Thereby, the decode signal of the decoder 317 is at the "Low" level and the write bus master data enable signal B_WDEN output by the AND logic 318 is at the "Low" level. Thereby, two bus master write data B_WDATA is retained in the FIFO memory.

Thereafter, if the control signal transfer module 10 outputs the bus master acknowledge signal B_AEN of the "High" level to the write bus master 3 at timing t5, the counter 311 counts up the acknowledge count value to "2" according to the bus master acknowledge signal B_AEN input to the count-up (UP) terminal at timing t6, which is the next clock cycle.

Thereafter, if the arbiter data write enable signal A_WDEN of the "High" level is input from the arbiter 1 at timing t7, the buffer control decoder 323 transfers the bus master write data B_WDATA (D1) latched in the flip-flop 321 to the flip-flop 322 at timing t8, which is the next clock cycle. Thereby, the bus master write data B_WDATA (D1) latched in the flip-flop 322 is output as the arbiter write data A_WDATA (D1) to the arbiter 1.

In addition, because the arbiter data write enable signal A_WDEN is at the "High" level at timing t8, the counter 316 counts up the latch region count value to "1" (indicating that there is one empty region). Thereby, the decode signal of the decoder 317 is at the "High" level and the write bus master data enable signal B_WDEN of the "High" level is output from the AND logic 318 to the write bus master 3. That is, the remaining write bus master data enable signal B_WDEN is output to the write bus master 3.

Thereafter, the buffer control decoder 323 causes the flip-flop 322 to temporarily latch the bus master write data B_WDATA (D2) input from the write bus master 3 at timing t9, which is the next clock cycle. Thereby, the bus master write data B_WDATA (D2) latched in the flip-flop 322 is output as the arbiter write data A_WDATA (D2) to the arbiter 1.

In addition, at timing t9, the write bus master data enable signal B_WDEN is at the "High" level and the arbiter data write enable signal A_WDEN is at the "High" level. Thus, the counter 316 retains the latch region count value as "1" (indicating that there is one empty region).

Thereafter, at timing t10, which is the next clock cycle, the buffer control decoder 323 causes the flip-flop 322 to temporarily latch the bus master write data B_WDATA (D3) input from the write bus master 3. Thereby, the bus master write data B_WDATA (D3) latched in the flip-flop 322 is output as the arbiter write data A_WDATA (D3) to the arbiter 1.

In addition, at timing t10, the write bus master data enable signal B_WDEN is at the "High" level and the arbiter data write enable signal A_WDEN is at the "High" level. Thus, the counter 316 retains the latch region count value as "1" (indicating that there is one empty region).

Timing t10 is a fourth clock cycle of the write bus master data enable signal B_WDEN. In the example of the timing chart illustrated in FIG. 9, the fourth clock cycle of the write bus master data enable signal B_WDEN is indicated by "*" within the write bus master data enable signal B_WDEN.

Thus, at timing t10, the counter 313 outputs Count Value of Write Bus Master Data Enable Signal B_WDEN="3." Thereby, the decode signal of the decoder 314 is at the "High" level, and a fourth data signal of the "High" level is input from the AND logic 315 to the count-down (DOWN) terminal of the counter 311. Thereby, the counter 311 counts down the acknowledge count value to "1" according to the fourth data signal input to the count-down (DOWN) terminal. Thereby, first access by the write bus master 3 to the DRAM ends.

However, at timing t10, the decode signal of the decoder 312 remains at the "High" level. That is, this indicates that an access request in which the write data transfer module 30 needs to output the arbiter write data A_WDATA remains. In addition, because the latch region count value is "1" (indicating that there is one empty region), the decode signal of the decoder 317 is also at the "High" level. Thereby, the "High" level of the write bus master data enable signal B_WDEN from the AND logic 318 is continuously output to the write bus master 3. That is, the write bus master data enable signal B_WDEN corresponding to second DRAM access by the write bus master 3 is continuously output.

The "High" level of the write bus master data enable signal B_WDEN continues at timing t10, so that the buffer control decoder 323 causes the flip-flop 322 to temporarily latch the bus master write data B_WDATA (D0) of the second DRAM access input from the write bus master 3 at timing t11, which is the next clock cycle. Thereby, the bus master write data B_WDATA (D0) latched in the flip-flop 322 is output as the arbiter write data A_WDATA (D0) of the second DRAM access to the arbiter 1.

In addition, at timing t11, the arbiter data write enable signal A_WDEN of the "High" level is continuously input from the arbiter 1. Thus, at timing t11, the write bus master data enable signal B_WDEN is at the "High" level and the arbiter data write enable signal A_WDEN is at the "High" level. Thus, the counter 316 retains the latch region count value as "1" (indicating that there is one empty region).

Thereafter, at timing t11, the control signal transfer module 10 outputs the bus master acknowledge signal B_AEN of the "High" level to the write bus master 3. Thus, the counter 311 counts up the acknowledge count value to "2" according to the bus master acknowledge signal B_AEN input to the count-up (UP) terminal at timing t12, which is the next clock cycle.

In addition, at timing t12, the buffer control decoder 323 causes the flip-flop 322 to temporarily latch the bus master write data B_WDATA (D1) of the second DRAM access input from the write bus master 3. Thereby, the bus master write data B_WDATA (D1) latched in the flip-flop 322 is output as the arbiter write data A_WDATA (D1) of the second DRAM access to the arbiter 1.

In addition, at timing t12, the write bus master data enable signal B_WDEN is at the "High" level and the arbiter data write enable signal A_WDEN is at the "High" level. Thus, the counter 316 retains the latch region count value as "1" (indicating that there is one empty region).

Thereafter, at timing t13, which is the next clock cycle, the buffer control decoder 323 causes the flip-flop 322 to temporarily latch the bus master write data B_WDATA (D2) of the second DRAM access input from the write bus master 3. Thereby, the bus master write data B_WDATA (D2) latched in the flip-flop 322 is output as the arbiter write data A_WDATA (D2) of the second DRAM access to the arbiter 1.

In addition, at timing t13, the write bus master data enable signal B_WDEN is at the "High" level and the arbiter data write enable signal A_WDEN is at the "High" level. Thus, the counter 316 retains the latch region count value as "1" (indicating that there is one empty region).

Thereafter, at timing t14, which is the next clock cycle, the buffer control decoder 323 causes the flip-flop 322 to temporarily latch the bus master write data B_WDATA (D3) of the second DRAM access input from the write bus master 3. Thereby, the bus master write data B_WDATA (D3) latched in the flip-flop 322 is output as the arbiter write data A_WDATA (D3) of the second DRAM access to the arbiter 1.

In addition, at timing t14, the write bus master data enable signal B_WDEN is at the "High" level and the arbiter data write enable signal A_WDEN is at the "High" level. Thus, the counter 316 retains the latch region count value as "1" (indicating that there is one empty region).

Timing t14 is the fourth clock cycle of the write bus master data enable signal B_WDEN. Thus, at timing t14, the counter 313 outputs Count Value of Write Bus Master Data Enable Signal B_WDEN="3." Thereby, the decode signal of the decoder 314 is at the "High" level, and the fourth data signal of the "High" level is input from the AND logic 315 to the count-down (DOWN) terminal of the counter 311. Thereby, the counter 311 counts down the acknowledge count value to "1" according to the fourth data signal input to the count-down (DOWN) terminal. Thereby, second access by the write bus master 3 to the DRAM ends.

However, at timing t14, the decode signal of the decoder 312 remains at the "High" level, and an access request in which the write data transfer module 30 needs to output the arbiter write data A_WDATA remains. In addition, because the latch region count value is "1" (indicating that there is one empty region), the decode signal of the decoder 317 is also at the "High" level. Thereby, the "High" level of the write bus master data enable signal B_WDEN from the AND logic 318 is continuously output to the write bus master 3. That is, the write bus master data enable signal B_WDEN corresponding to third DRAM access by the write bus master 3 is continuously output.

The "High" level of the write bus master data enable signal B_WDEN continues at timing t14, so that the buffer control decoder 323 causes the flip-flop 322 to temporarily latch the bus master write data B_WDATA (D0) of the third DRAM access input from the write bus master 3 at timing t15, which is the next clock cycle. Thereby, the bus master write data B_WDATA (D0) latched in the flip-flop 322 is output as the arbiter write data A_WDATA (D0) of the third DRAM access to the arbiter 1.

In addition, at timing t15, the write bus master data enable signal B_WDEN is at the "High" level and the arbiter data write enable signal A_WDEN is at the "High" level. Thus, the counter 316 retains the latch region count value as "1" (indicating that there is one empty region).

At timing t15, the arbiter data write enable signal A_WDEN input from the arbiter 1 is at the "Low" level.

Thereafter, at timing t16, which is the next clock cycle, the arbiter data write enable signal A_WDEN output from the arbiter 1 is at the "Low" level. Thus, the buffer control decoder 323 causes the flip-flop 321 to temporarily latch the bus master write data B_WDATA (D1) of the third DRAM access input from the write bus master 3.

In addition, at timing t16, the write bus master data enable signal B_WDEN is at the "High" level, and the arbiter data write enable signal A_WDEN is at the "Low" level. Thus, the counter 316 counts down the latch region count value to "0" (indicating that there is no empty region). Thereby, the decode signal of the decoder 317 is at the "Low" level and the write bus master data enable signal B_WDEN output by the AND logic 318 is at the "Low" level. Thereby, two (D0 and D1) bus master write data B_WDATA are retained in the FIFO memory.

If the arbiter data write enable signal A_WDEN of the "High" level is input from the arbiter 1 at timing t16, the buffer control decoder 323 transfers the bus master write data B_WDATA (D1) of the third DRAM access latched in the flip-flop 321 to the flip-flop 322 at timing t17, which is the next clock cycle. Thereby, the bus master write data B_WDATA (D1) latched in the flip-flop 322 is output as the arbiter write data A_WDATA (D1) of the third DRAM access to the arbiter 1.

In addition, because the arbiter data write enable signal A_WDEN is at the "High" level at timing t17, the counter 316 counts up the latch region count value to "1" (indicating that there is one empty region). Thereby, the decode signal of the decoder 317 is at the "High" level and the write bus master data enable signal B_WDEN of the "High" level is output from the AND logic 318 to the write bus master 3. That is, the remaining write bus master data enable signal B_WDEN corresponding to the third DRAM access by the write bus master 3 is output.

At timing t17, the arbiter data write enable signal A_WDEN input from the arbiter 1 is at the "Low" level.

Thereafter, at timing t18, which is the next clock cycle, the arbiter data write enable signal A_WDEN output from the arbiter 1 is at the "Low" level. Thus, the buffer control decoder 323 causes the flip-flop 321 to temporarily latch the bus master write data B_WDATA (D2) of the third DRAM access input from the write bus master 3.

In addition, at timing t18, the write bus master data enable signal B_WDEN is at the "High" level and the arbiter data write enable signal A_WDEN is at the "Low" level. Thus, the counter 316 counts down the latch region count value to "0" (indicating that there is no empty region). Thereby, the decode signal of the decoder 317 is at the "Low" level and the write bus master data enable signal B_WDEN output by the AND logic 318 is at the "Low" level. Thereby, two (D1 and D2) bus master write data B_WDATA are retained in the FIFO memory.

If the arbiter data write enable signal A_WDEN of the "High" level is input from the arbiter 1 at timing t18, the buffer control decoder 323 transfers the bus master write data B_WDATA (D2) of the third DRAM access latched in the flip-flop 321 to the flip-flop 322 at timing t19, which is the next clock cycle. Thereby, the bus master write data B_WDATA (D2) latched in the flip-flop 322 is output as the arbiter write data A_WDATA (D2) of the third DRAM access to the arbiter 1.

In addition, because the arbiter data write enable signal A_WDEN is at the "High" level at timing t19, the counter 316 counts up the latch region count value to "1" (indicating that there is one empty region). Thereby, the decode signal of the decoder 317 is at the "High" level and the write bus master data enable signal B_WDEN of the "High" level is output from the AND logic 318 to the write bus master 3. That is, the remaining write bus master data enable signal B_WDEN corresponding to the third DRAM access by the write bus master 3 is output.

At timing t19, the arbiter data write enable signal A_WDEN input from the arbiter 1 is at the "Low" level.

Thereafter, at timing t20, which is the next clock cycle, the arbiter data write enable signal A_WDEN output from the arbiter 1 is at the "Low" level. Thus, the buffer control decoder 323 causes the flip-flop 321 to temporarily latch the bus master write data B_WDATA (D3) of the third DRAM access input from the write bus master 3.

In addition, at timing t20, the write bus master data enable signal B_WDEN is at the "High" level and the arbiter data write enable signal A_WDEN is at the "Low" level. Thus, the counter 316 counts down the latch region count value to "0" (indicating that there is no empty region). Thereby, the decode signal of the decoder 317 is at the "Low" level and the write bus master data enable signal B_WDEN output by the AND logic 318 is at the "Low" level. Thereby, two (D2 and D3) bus master write data B_WDATA are retained in the FIFO memory.

Timing t20 is the fourth clock cycle of the write bus master data enable signal B_WDEN. Thus, at timing t20, the counter 313 outputs Count Value of Write Bus Master Data Enable Signal B_WDEN="3." Thereby, the decode signal of the decoder 314 is at the "High" level, and the fourth data signal of the "High" level is input from the AND logic 315 to the count-down (DOWN) terminal of the counter 311. Thereby, the counter 311 counts down the acknowledge count value to "0" according to the fourth data signal input to the count-down (DOWN) terminal. Thereby, the third access by the write bus master 3 to the DRAM ends.

In addition, at timing t20, the decode signal of the decoder 312 is at the "Low" level. That is, an access request in which the write data transfer module 30 needs to output the arbiter write data A_WDATA does not remain. Thus, the write bus master data enable signal B_WDEN output by the AND logic 318 is at the "Low" level, regardless of the latch region count value, until the control signal transfer module 10 re-outputs the bus master acknowledge signal B_AEN of the "High" level to the write bus master 3.

Thereafter, if the arbiter data write enable signal A_WDEN of the "High" level is input from the arbiter 1 at timing t20, the buffer control decoder 323 transfers the bus master write data B_WDATA (D3) of the third DRAM access latched in the flip-flop 321 to the flip-flop 322 at timing t21, which is the next clock cycle. Thereby, the bus master write data B_WDATA (D3) latched in the flip-flop 322 is output as the arbiter write data A_WDATA (D3) of the third DRAM access to the arbiter 1.

In addition, because the arbiter data write enable signal A_WDEN is at the "High" level at timing t21, the counter 316 counts up the latch region count value to "1" (indicating that there is one empty region).

At timing t21, the arbiter data write enable signal A_WDEN input from the arbiter 1 is at the "Low" level. Thereafter, at timing t22, the arbiter 1 outputs the arbiter data write enable signal A_WDEN of the "High" level, and writes the arbiter write data A_WDATA (D3) of the third DRAM access output from the flip-flop 322 to the DRAM. Thereafter, at timing t23, the arbiter data write enable signal A_WDEN is at the "Low" level, and the third DRAM access in the arbiter 1 ends.

In this manner, access by the write bus master 3 to the DRAM ends. When the write bus master 3 re-accesses the DRAM, a first access request to the DRAM is re-issued. Thereby, the control signal transfer module 10 outputs the bus master acknowledge signal B_AEN of the "High" level to the write bus master 3. Thereby, the write data transfer module 30 re-performs an operation of relaying the data enable (DEN) signal issued (output) from the arbiter 1 to the write bus master 3 and the write data (WDATA) output from the write bus master 3 to the arbiter 1.

In this manner, the write data transfer module 30 can output the write bus master data enable signal B_WDEN to the write bus master 3 early even in a state in which the arbiter data write enable signal A_WDEN is not input from the arbiter 1. Thereby, it is possible to output the arbiter write data A_WDATA immediately after the write data transfer module 30 retains the bus master write data B_WDATA in advance and the arbiter data write enable signal A_WDEN is input from the arbiter 1. When an access request to the DRAM from the write bus master 3 is made again and the control signal transfer module 10 outputs the bus master acknowledge signal B_AEN to the write master 3, the write data transfer module 30 operates again according to the input bus master acknowledge signal B_AEN of the "High" level as illustrated at timing t23 of FIG. 9 or later. Because an operation of the write data transfer module 30 illustrated at timing t23 of FIG. 9 or later is the same as the operation described at timings t1 to t23 of FIG. 9, detailed description of these timings is omitted here.

As described above, the write data transfer module 30 outputs the write bus master data enable signal B_WDEN to the write bus master 3 at a timing before the arbiter data write enable signal A_WDEN output from the arbiter 1 to the write bus master 3. In addition, the write data transfer module 30 makes an output to the arbiter 1 by adjusting the timing of the bus master write data B_WDATA input from the write bus master 3. Thereby, the write data transfer module 30 can relay each signal in a state in which a predetermined protocol has been kept between the arbiter 1 and the write bus master 3. Thereby, it is possible to set the timing of a signal between the arbiter 1 and the write bus master 3, for example, to substantially the same state as when the flip-flop has been inserted, after a predetermined protocol has been kept between the write data transfer module 30 and the arbiter 1 and between the write bus master 3 and the write data transfer module 30. Thereby, the write data transfer module 30 alleviates a limitation of a signal delay time which is caused because a layout position of the arbiter 1 within the system LSI and a layout position of the write bus master 3 are away from each other or a clock cycle is shortened by speeding up an operation clock of the system LSI.

As described above, according to a mode for practicing the present invention, it is possible to relay each signal in a state in which a predetermined protocol has been kept between the arbiter and the bus master by inserting a signal transfer circuit between the bus master and the arbiter. In addition, it is possible to adjust the timing of a signal between the signal transfer circuit and the arbiter and the timing of a signal between the bus master and the signal transfer circuit, for example, to substantially the same state as when the flip-flop has been inserted, after a predetermined protocol has been kept between the signal transfer circuit and the arbiter and between the bus master and the signal transfer circuit. Thereby, it is possible to improve the timing of a signal between the signal transfer circuit and the arbiter and the timing of a signal between the bus master and the signal transfer circuit without changing the bus master or the arbiter. Thereby, it is possible to alleviate a limitation of a signal delay time which is caused because a layout position of the arbiter 1 within the system LSI and a layout position of the bus master are away from each other time by increasing the number of bus masters embedded in the system LSI or a clock cycle is shortened by speeding up an operation clock of the system LSI. Thereby, it is possible to implement the system LSI in which a wider-band system has been constructed.

It is desirable to dispose a signal transfer circuit in an appropriate position (for example, an intermediate position or the like) of a path between the bus master and the arbiter when the signal transfer circuit is inserted between the bus master and the arbiter.

Although the case in which one signal transfer circuit (a set of the control signal transfer module 10 and the read data transfer module 20 or a set of the control signal transfer module 10 and the write data transfer module 30) is inserted between the arbiter and the bus master has been described in the first preferred embodiment, the number of signal transfer circuits inserted between the arbiter and the bus master is not limited to the mode for practicing the present invention. For example, if timing of a signal between the arbiter and the bus master is still strict even when one signal transfer circuit is inserted, it is possible to improve the signal timing by linking together and inserting a plurality of signal transfer circuits (a set of the control signal transfer module 10 and the read data transfer module 20 or a set of the control signal transfer module 10 and the write data transfer module 30). In this case, for example, it is desirable to dispose signal transfer circuits, for example, in positions in which paths between the bus masters and the arbiter are arranged at equivalent intervals.

In addition, the configuration that implements a function of a two-stage FIFO memory and retains two bus master write data B_WDATA by the flip-flop 321, the selector 324, and the flip-flop 322 within the timing adjusting unit 320 in advance has been described in the first preferred embodiment. However, the configuration for retaining the bus master write data B_WDATA output from the write bus master 3 is not limited to the mode for practicing the present invention. For example, it is also possible to make a configuration in which a memory region in which all four-burst bus master write data B_WDATA is retained is provided in the timing adjustment unit 320 and all the bus master write data B_WDATA is retained in advance. In addition, it is also possible to make a configuration in which two memory regions in which all the four-burst bus master write data B_WDATA is retained are provided in the timing adjustment unit 320 and the retention of the bus master write data B_WDATA input from the write bus master 3 and the output of the arbiter write data A_WDATA to the arbiter 1 are alternately switched.

In addition, although the case in which the signal transfer circuit of the set of the control signal transfer module 10 and the read data transfer module 20 or the signal transfer circuit of the set of the control signal transfer module 10 and the write data transfer module 30 is inserted between the read bus master 2 or the write bus master 3 and the arbiter 1 has been described in the first preferred embodiment, the configuration of the transfer module in the signal transfer circuit is not limited to the mode for practicing the present invention. For example, likewise, it is possible to improve the signal timing by inserting the control signal transfer path having one set of the control signal transfer module 10, the read data transfer module 20, and the write data transfer module 30 between the bi-directional bus master and the arbiter when the bus master is the bi-directional bus master that performs both reading of data from the DRAM and writing of data to the DRAM.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A signal transfer circuit, which is inserted between each of a plurality of bus masters outputting an access request to a memory and an arbiter that arbitrates the access request input to the memory from each of the bus masters connected to the memory and controls access to the memory according to the access request, and relays each signal between the arbiter and a corresponding bus master, the signal transfer circuit comprising:

a control signal transfer unit configured to output an access request output signal and a memory address output signal to the arbiter after adjusting timings of an access request input signal corresponding to the access request and a memory address input signal input from the corresponding bus master so that the access request output signal to the arbiter is relayed substantially when the access request is input to the memory from the corresponding bus master, and the control signal transfer unit configured to output an access permission output signal to indicate the acceptance of the access request to the corresponding bus master prior, to an access permission input signal, which indicates that the access request is permitted, is returned from the arbiter to the corresponding bus master; and a data signal transfer unit configured to output each data output signal to the corresponding bus master or the arbiter after adjusting a timing of each data input signal including data read from the memory inputted from the arbiter or data to be written to the memory inputted from the corresponding bus master when data including the data read from the memory or the data to be written to the memory is relayed to the corresponding bus master or the arbiter, and the data signal transfer unit configured to output a data validity period output signal to the corresponding bus master after adjusting a timing of a data validity period input signal indicating a period in which the data read from the memory inputted from the arbiter is valid for output to the corresponding bus master.

2. The signal transfer circuit according to claim 1, wherein: the control signal transfer unit comprises:

an access request timing adjustment unit configured to determine whether or not to output the access request output signal based on the access request input signal and the access permission input signal, output an output timing signal indicating that the access request output signal is output when the access request output signal is determined to be output, and output the access request output signal from a next timing after the output timing signal has been output;

an address timing adjustment unit configured to output the memory address input signal as the memory address output signal from the next timing after the output timing signal has been output; and an access permission timing adjustment unit configured to output the output timing signal as the access permission output signal at the next timing, and the access request timing adjustment unit determines that the access request output signal corresponding to a previous access request by the corresponding bus master has already been output when the access request input signal corresponding to a current access request has been input from the corresponding bus master, that an output of the access request output signal corresponding to the current access request is held when the access permission input signal, which permits the previous access request, is not input from the arbiter, and that the access request output signal corresponding to the current access request is output when the access permission input signal, which permits the previous access request, has been input from the arbiter.

3. The signal transfer circuit according to claim 2, wherein, when the corresponding bus master corresponding to the signal transfer circuit is a bus master that reads data from the memory according to the access request, the data signal transfer unit comprises:

a read data timing adjustment unit configured to output each data input signal input from the arbiter as each data output signal to the corresponding bus master at the next timing; and a read data validity period timing adjustment unit configured to output the data validity period input signal input from the arbiter as the data validity period output signal to the corresponding bus master at the next timing.

4. The signal transfer circuit according to claim 3, wherein the next timing is a timing of a common clock cycle in which the signal transfer circuit, the arbiter, and the corresponding bus master operate.

5. The signal transfer circuit according to claim 2, wherein, when the corresponding bus master corresponding to the signal transfer circuit is a bus master that writes data to the memory according to the access request, the data signal transfer unit comprises:

a write data validity period timing adjustment unit configured to output the data validity period output signal to the corresponding bus master before the data validity input signal input from the arbiter; and a write data timing adjustment unit configured to include a plurality of data retention units that retain a predetermined number of data input signals or all data input signals within a plurality of data input signals input from the corresponding bus master according to an early output data validity period output signal, temporarily retain each data input signal input from the corresponding bus master in each data retention unit at the next timing, and output each retained data input signal as each data output signal after a timing has been adjusted to the arbiter when the data validity period input signal has been input from the arbiter.

6. The signal transfer circuit according to claim 5, wherein: the write data validity period timing adjustment unit comprises:

a permission access measurement unit configured to measure a number of permitted access requests in which an output of all data output signals corresponding to the access request to the arbiter does not end based on the access permission output signal and the data validity period output signal, and output a remaining permission access signal, which indicates whether or not there is a permitted access request to the arbiter, which is generated based on a measuring result, that has already been permitted by the corresponding bus master and the output of all the data output signals to the arbiter has not ended; and a data measuring unit configured to measure an number of data retention units capable of retaining the data input signal based on the data validity period input signal and the data validity period output signal, and output a number of retainable data, which is a measuring result, and a retention enable/disable signal, which indicates whether or not there is the data retention unit capable of retaining the data input signal, generated based on the measuring result, a signal generated based on a remaining permission access signal and the retention enable/disable signal is output as the data validity period output signal, and the write data timing adjustment unit includes a data retention control unit configured to control whether or not to retain each data input signal input from the corresponding bus master in one data retention unit within a plurality of data retention units based on the number of retainable data, the data validity period output signal, and the data validity period input signal.

7. The signal transfer circuit according to claim 6, wherein the write data timing adjustment unit includes first and second data retention units, which retain two data input signals input from the corresponding bus master at the next timing, and outputs the data input signal retained by the second data retention unit as the data output signal to the arbiter, and the data retention control unit controls the first and second data retention units so as to:

cause the first data retention unit to retain the data input signal at the next timing when the number of retainable data indicates that the number of data retention units capable of retaining the data input signal is 1, the data validity period output signal indicates that the data input signal is valid, and the data validity period input signal indicates that the data output signal is invalid;

cause the second data retention unit to retain the data input signal at the next timing when the number of retainable data indicates that the number of data retention units capable of retaining the data input signal is 2 and the data validity period output signal indicates that the data input signal is valid;

cause the second data retention unit to retain the data input signal retained in the first data retention unit at the next timing when the number of retainable data indicates that the number of data retention units capable of retaining the data input signal is 0 and the data validity period input signal indicates that the data output signal is valid; and cause the second data retention unit to retain the data input signal at the next timing when the number of retainable data indicates that the number of data retention units capable of retaining the data input signal is 1, the data validity period output signal indicates that the data input signal is valid, and the data validity period input signal indicates that the data output signal is valid.

8. The signal transfer circuit according to claim 7, wherein the next timing is a timing of a common clock cycle in which the signal transfer circuit, the arbiter, and the corresponding bus master operate.

9. The signal transfer circuit according to claim 6, wherein the next timing is a timing of a common clock cycle in which the signal transfer circuit, the arbiter, and the corresponding bus master operate.

10. The signal transfer circuit according to claim 5, wherein the next timing is a timing of a common clock cycle in which the signal transfer circuit, the arbiter, and the corresponding bus master operate.

11. The signal transfer circuit according to claim 2, wherein the next timing is a timing of a common clock cycle in which the signal transfer circuit, the arbiter, and the corresponding bus master operate.

* * * * *